United States Patent
Petscher et al.

(10) Patent No.: US 11,396,368 B2
(45) Date of Patent: Jul. 26, 2022

(54) AIRPLANE WING

(71) Applicant: THE AIRCRAFT PERFORMANCE COMPANY GmbH, Hamburg (DE)

(72) Inventors: Hans-Jörg Petscher, Hamburg (DE); Volker Kassera, Starzach (DE)

(73) Assignee: THE AIRCRAFT PERFORMANCE COMPANY GmbH, Hamburg (DE)

( * ) Notice: Subject to any disclaimer, the term of this patent is extended or adjusted under 35 U.S.C. 154(b) by 4 days.

(21) Appl. No.: 16/772,654

(22) PCT Filed: Dec. 11, 2018

(86) PCT No.: PCT/EP2018/084364
§ 371 (c)(1),
(2) Date: Jun. 12, 2020

(87) PCT Pub. No.: WO2019/115528
PCT Pub. Date: Jun. 20, 2019

(65) Prior Publication Data
US 2021/0221495 A1 Jul. 22, 2021

(30) Foreign Application Priority Data
Dec. 15, 2017 (EP) .................................... 17020576

(51) Int. Cl.
*B64C 23/06* (2006.01)
*B64C 5/08* (2006.01)
*B64C 3/10* (2006.01)

(52) U.S. Cl.
CPC .............. *B64C 23/072* (2017.05); *B64C 5/08* (2013.01); *B64C 3/10* (2013.01)

(58) Field of Classification Search
CPC ........... B64C 3/10; B64C 23/072; B64C 5/08; B64C 23/076; B64C 5/10; B64C 23/06; B64C 23/065
See application file for complete search history.

(56) References Cited

U.S. PATENT DOCUMENTS

| | | |
|---|---|---|
| 4,046,336 A | 9/1977 | Tangler |
| 4,457,479 A | 7/1984 | Daude |
| 4,671,472 A | 6/1987 | Goodson |

(Continued)

FOREIGN PATENT DOCUMENTS

| | | |
|---|---|---|
| CA | 2643071 A1 | 8/2007 |
| CN | 206050054 U | 3/2017 |

(Continued)

OTHER PUBLICATIONS

International Search Report under International Application No. PCT/EP2018/084364 dated Jan. 31, 2019.

(Continued)

*Primary Examiner* — Assres H Woldemaryam
(74) *Attorney, Agent, or Firm* — Howard IP Law Group, PC

(57) ABSTRACT

The invention relates to a wing for an airplane having at least two winglets, wherein a local angle of attack at the upstream winglet shall be reduced by a passive elastic morphing in heavy load conditions and wherein stall shall occur for the downstream winglet, then. Both serves for limiting and reducing the forces and torques produced by the winglets.

20 Claims, 29 Drawing Sheets

(56) References Cited

U.S. PATENT DOCUMENTS

| | | | |
|---|---|---|---|
| 4,671,473 A * | 6/1987 | Goodson | B64C 23/076 |
| | | | 244/199.4 |
| 5,823,480 A | 10/1998 | La Roche | |
| 6,015,115 A | 1/2000 | Dorsett et al. | |
| 6,345,790 B1 * | 2/2002 | Brix | B64C 23/076 |
| | | | 244/199.4 |
| 6,375,126 B1 | 4/2002 | Sakurai et al. | |
| 6,394,397 B1 | 5/2002 | Ngo et al. | |
| 6,578,798 B1 | 6/2003 | Dizdarevic | |
| 6,622,974 B1 | 9/2003 | Dockter et al. | |
| 6,796,534 B2 | 9/2004 | Beyer et al. | |
| 6,910,661 B2 | 6/2005 | Dockter et al. | |
| 7,028,948 B2 | 4/2006 | Pitt | |
| 7,744,038 B2 | 6/2010 | Sankrithi et al. | |
| 7,789,343 B2 | 9/2010 | Sarh et al. | |
| 7,798,443 B2 | 9/2010 | Hamilton et al. | |
| 8,128,035 B2 | 3/2012 | Malachowski et al. | |
| 8,256,719 B2 | 9/2012 | Wood et al. | |
| 8,333,348 B1 | 12/2012 | Miller | |
| 8,336,830 B2 | 12/2012 | Eberhardt | |
| 8,342,447 B2 | 1/2013 | Etling | |
| 8,366,056 B2 | 2/2013 | Garang | |
| 8,366,057 B2 | 2/2013 | Vos et al. | |
| 8,925,870 B1 | 1/2015 | Gordon et al. | |
| 8,936,219 B2 * | 1/2015 | Roman | B64C 23/069 |
| | | | 244/199.4 |
| 8,944,386 B2 * | 2/2015 | Gratzer | B64C 23/069 |
| | | | 244/199.4 |
| 9,162,755 B2 * | 10/2015 | Guida | B64C 23/069 |
| 9,469,391 B1 | 10/2016 | Dong | |
| 9,623,960 B2 * | 4/2017 | Devenyi | B64C 23/072 |
| 9,975,622 B2 * | 5/2018 | Snook | B64C 3/40 |
| 10,343,763 B2 * | 7/2019 | Cross | F04D 29/38 |
| 10,526,073 B2 * | 1/2020 | Theurich | B64C 23/065 |
| 11,008,088 B2 * | 5/2021 | Dege | B64C 3/56 |
| 11,034,436 B2 * | 6/2021 | Wood | B64C 23/069 |
| 2001/0032907 A1 | 10/2001 | Borchers | |
| 2002/0060272 A1 | 5/2002 | La Roche | |
| 2005/0045765 A1 | 3/2005 | Pitt | |
| 2006/0027703 A1 | 2/2006 | Bussom | |
| 2006/0118675 A1 | 6/2006 | Tidwell | |
| 2006/0144992 A1 | 7/2006 | Jha | |
| 2007/0262205 A1 * | 11/2007 | Grant | B64C 23/072 |
| | | | 244/199.2 |
| 2009/0014596 A1 | 1/2009 | Pearson | |
| 2009/0039204 A1 * | 2/2009 | Eberhardt | B64C 23/069 |
| | | | 244/199.4 |
| 2009/0084904 A1 * | 4/2009 | Detert | B64C 23/065 |
| | | | 244/199.4 |
| 2011/0084174 A1 | 4/2011 | Hemmelgarn et al. | |
| 2011/0101169 A1 | 5/2011 | Schaber | |
| 2012/0104181 A1 | 3/2012 | Rix | |
| 2012/0185181 A1 * | 7/2012 | Chankaya | B64C 23/076 |
| | | | 702/41 |
| 2015/0028151 A1 | 1/2015 | Bevirt | |
| 2018/0043985 A1 | 2/2018 | Thompson | |
| 2018/0237127 A1 * | 8/2018 | Hewson | B64C 3/187 |
| 2018/0304997 A1 * | 10/2018 | Dhandhania | B64C 23/065 |
| 2018/0334253 A1 | 11/2018 | Geneste | |
| 2019/0202543 A1 * | 7/2019 | Gatto | B64C 3/187 |

FOREIGN PATENT DOCUMENTS

| | | |
|---|---|---|
| DE | 2149956 A1 | 4/1973 |
| DE | 19706668 A1 | 9/1998 |
| DE | 102004019576 A1 | 11/2005 |
| DE | 202014104042 U1 | 9/2015 |
| EP | 0878394 A1 | 5/1997 |
| EP | 1127786 A1 | 2/2000 |
| EP | 1149761 A1 | 10/2001 |
| EP | 1205384 A2 | 5/2002 |
| EP | 1531126 A1 | 1/2005 |
| EP | 2930103 A1 | 10/2015 |
| EP | 2955102 A1 | 12/2015 |
| EP | 3034396 A1 | 2/2016 |
| EP | 2998218 A1 | 3/2016 |
| EP | 3269635 A1 | 1/2018 |
| EP | 3269636 A1 | 1/2018 |
| JP | 20162790 A | 1/2016 |
| SU | 2118270 C1 | 8/1988 |
| WO | 2007095931 A2 | 8/2007 |
| WO | 2009149932 A2 | 12/2009 |
| WO | 2017081402 A1 | 5/2017 |
| WO | 2018010850 A1 | 1/2018 |

OTHER PUBLICATIONS

R. Cosin et al: "Aerodynamic Analysis of Multi-Winglets for Low Speed Aircraft" www.icas.org/icas_archive/icas2010/papers/067;Jan. 1, 2010.

International Search Report dated Oct. 12, 2017 for related PCT Application No. PCT/EP2017/025204.

Annex to European Search Report dated May 23, 2018 for related EP Application No. EP 17 020 576.

Pages from European Search Report dated May 29, 2018 for related EP Application No. EP 18 020 023.

Written Opinion of the International Searching Authority dated Mar. 28, 2018 for related PCT Application No. PCT/EP2017/025201.

Pages from European Search Report, including Annex, dated Aug. 10, 2017 for related EP Application No. EP 16 020 445.

Pages from European Search Report, including Annex, dated Jan. 17, 2017 for related EP Application No. EP 16 020 266.

International Search Report dated Feb. 11, 2019 for related PCT Application No. PCT/EP2019/050774.

* cited by examiner

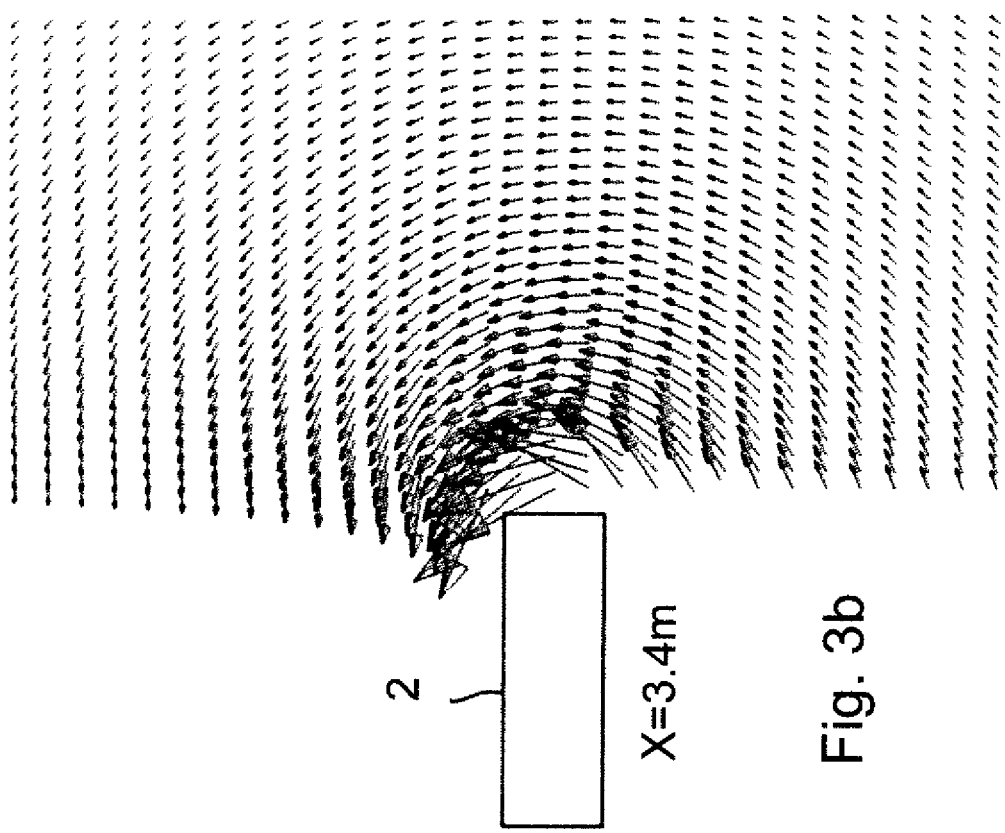

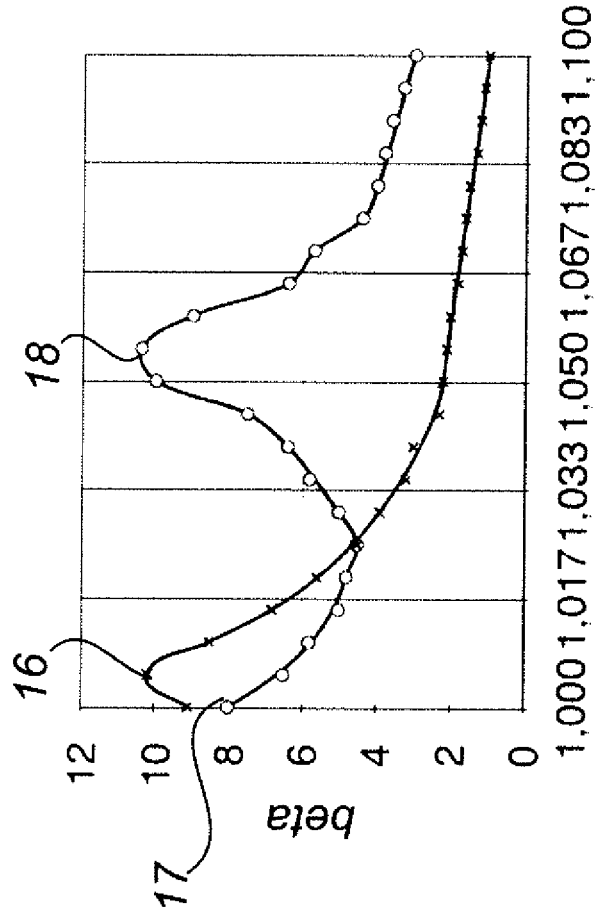
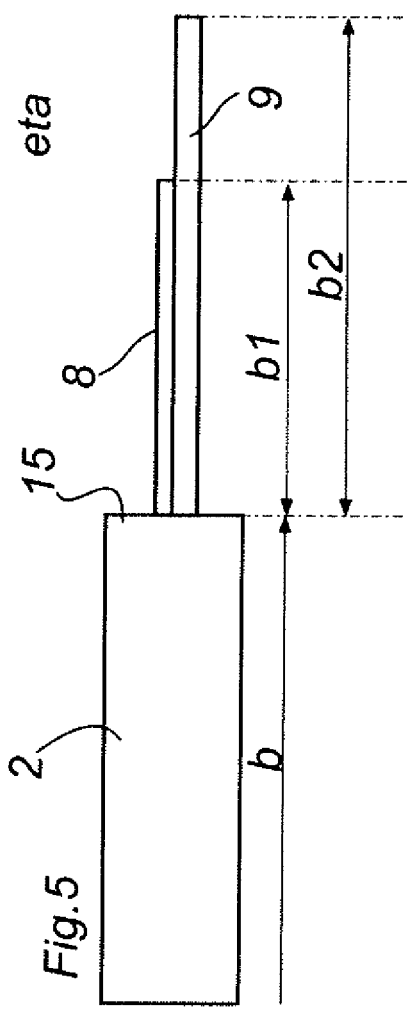

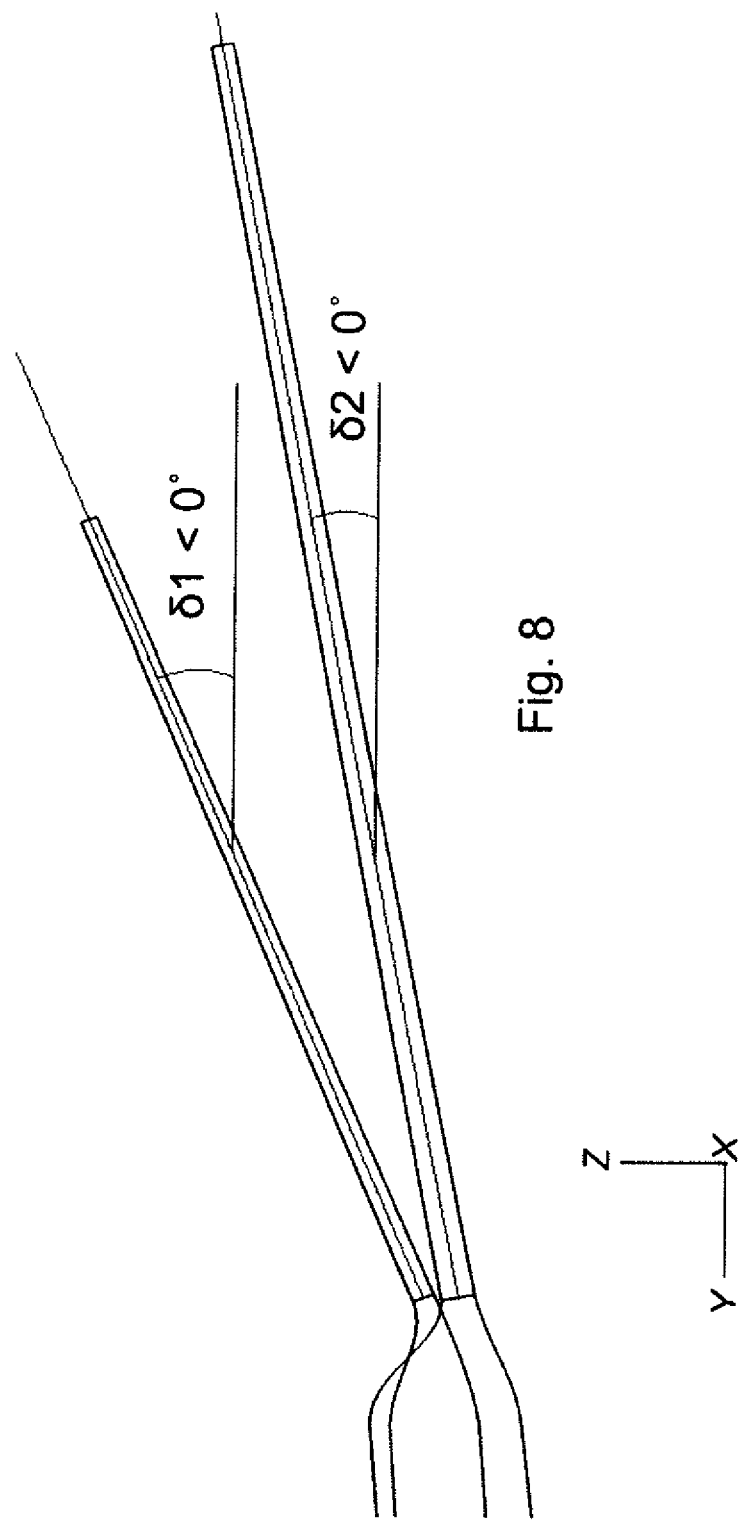

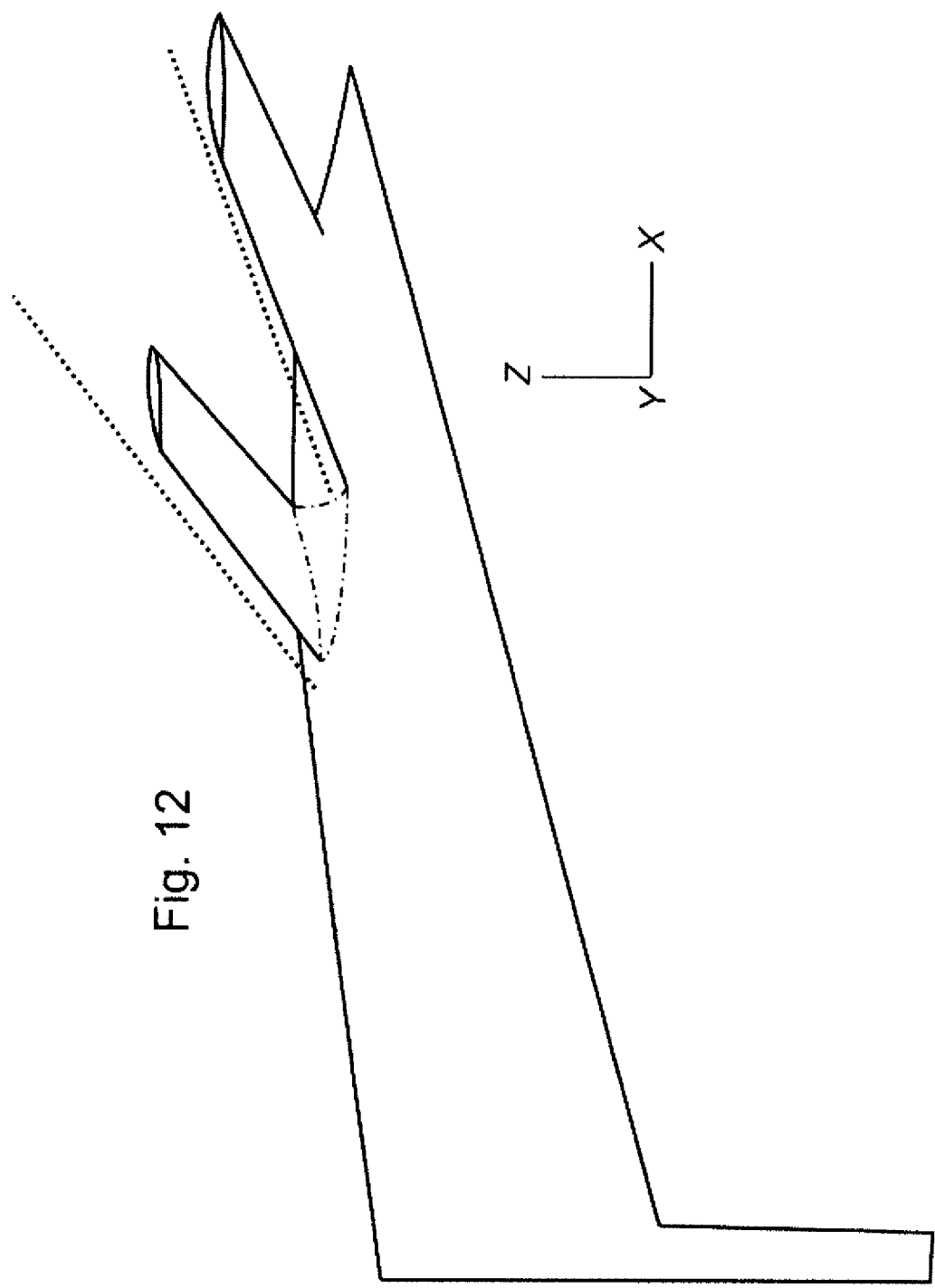

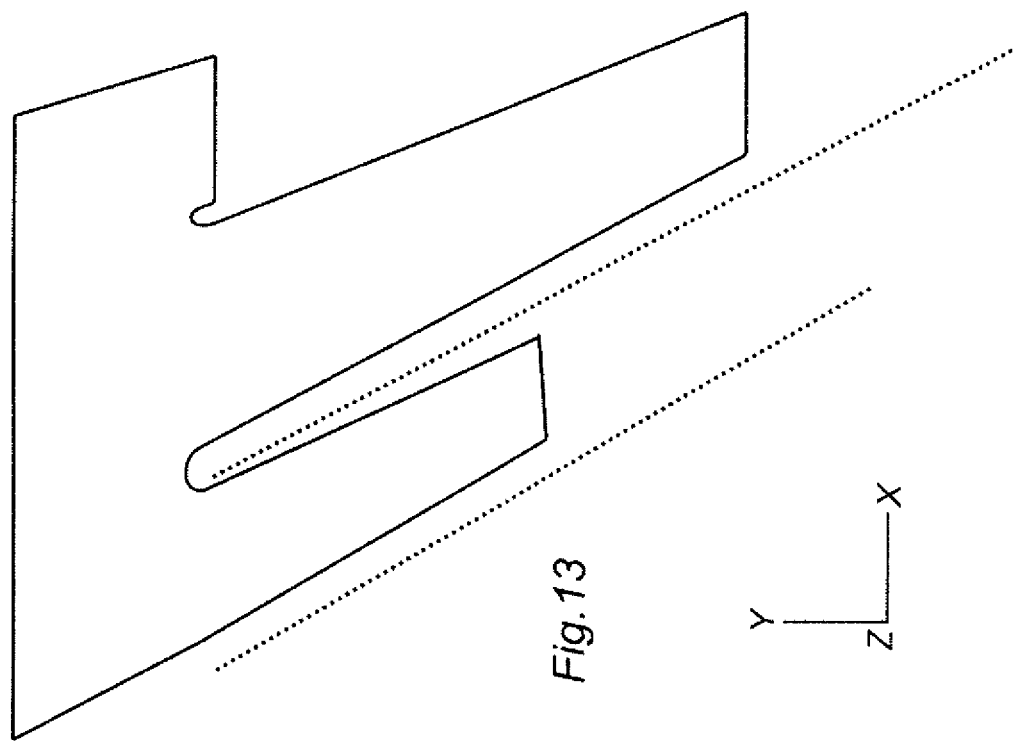

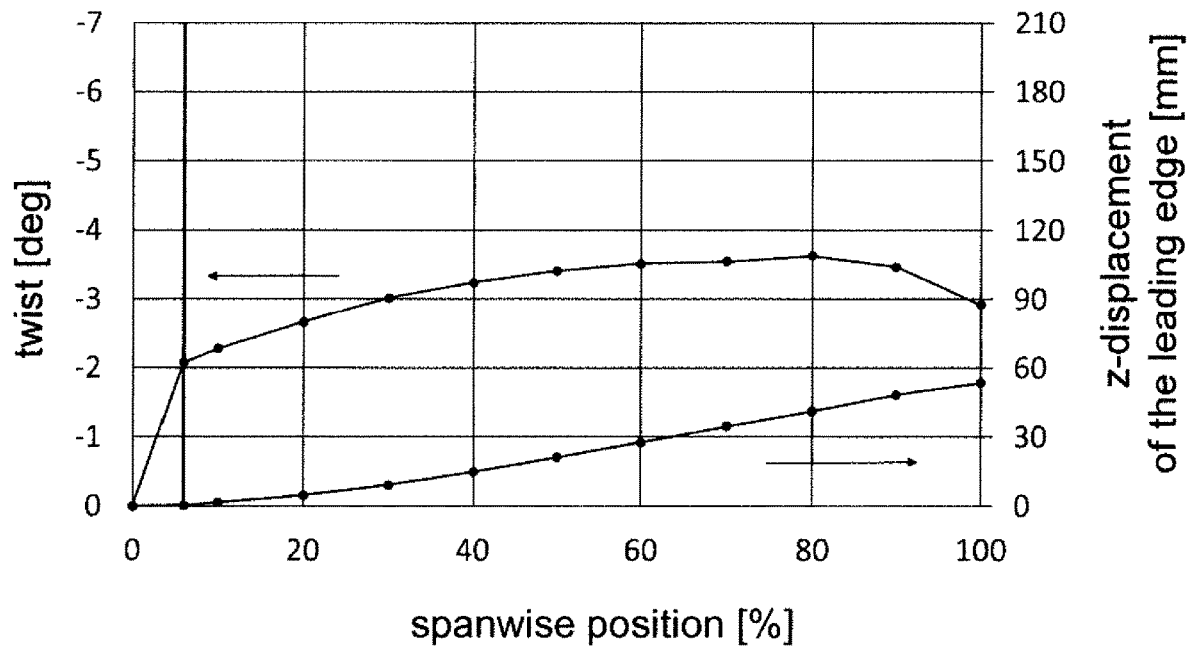
Fig. 30 winglet 1
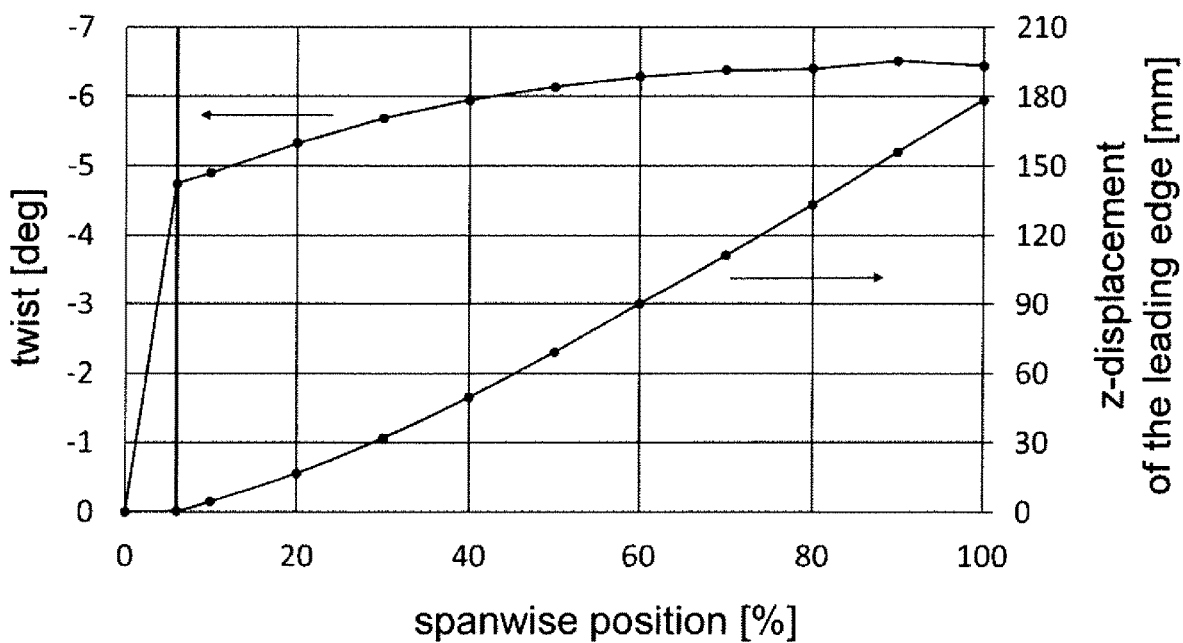
Fig. 31 winglet 2

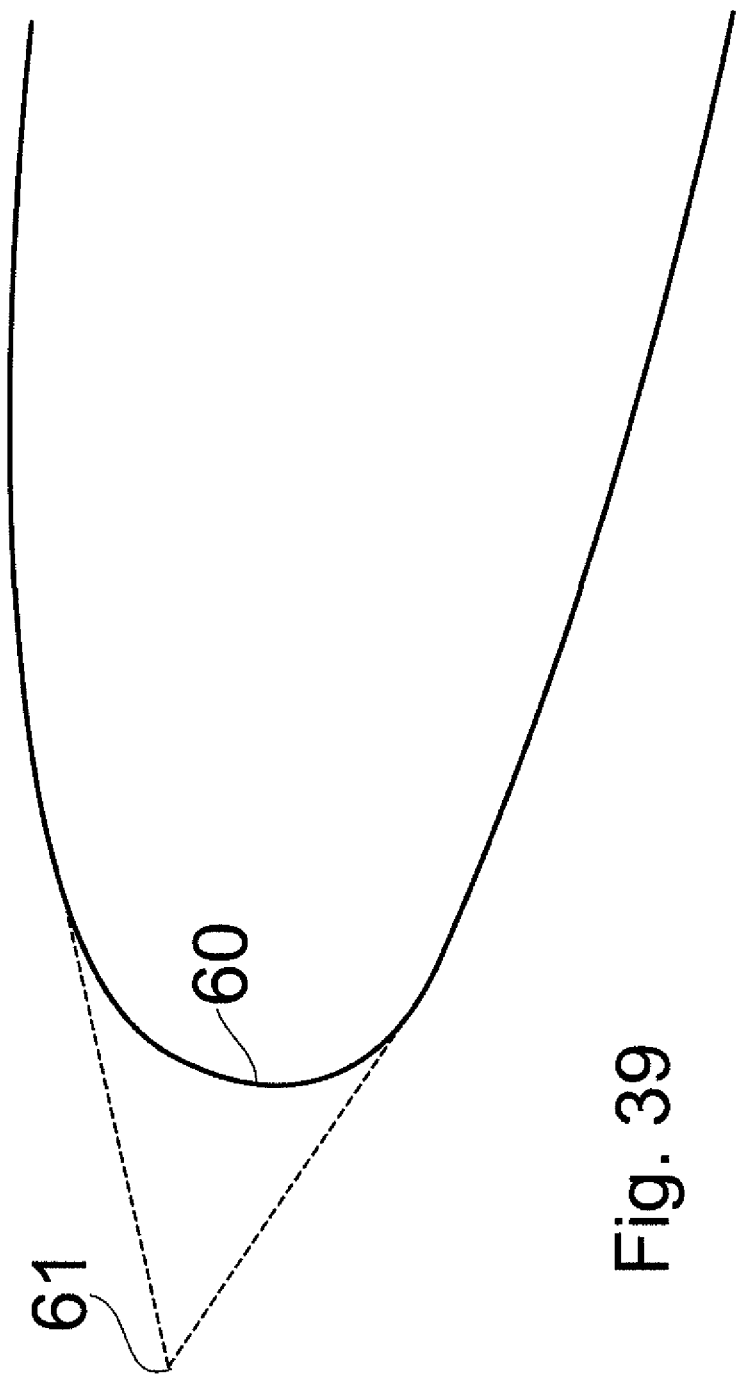

AIRPLANE WING

CROSS-REFERENCE TO RELATED APPLICATIONS

This application is a national stage application under 35 U.S.C. § 371 of International Patent Application No. PCT/EP2018/084364 filed Dec. 11, 2018, and which claims priority to EP 17 020 576.9 filed on Dec. 15, 2017, the subject matter of which is incorporated by reference herein in its entirety for all purposes.

FIELD OF INVENTION

The present invention relates to an airplane and a wing for an airplane.

BACKGROUND

Airplanes are one of the most important transportation apparatus both for persons and for goods as well as for military applications, and they are almost without alternative for most long-distance travels. The present invention is related to airplanes in a sense that does not include helicopters, and it relates to a wing for an airplane in a sense that does not include rotor blades for helicopters. In particular, the invention relates to airplanes having fixed wings and to such fixed wings themselves.

The basic function of a motorized airplane and its wings is to produce a certain velocity by means of a propulsion engine and to produce a required lift by means of wings of the airplane in the airflow resulting from the velocity. This function is the subject of the aerodynamic design of the wings of the airplane, for example with regard to their size, profile etc.

It is generally known to use so-called wing tip devices or winglets at the outer ends of the main wings of airplanes, i.e. of those wings mainly or exclusively responsible for the lift. These winglets are meant to reduce so-called wing tip vortices which result from a pressure difference between a region above and a region below the wing, said pressure difference being the cause of the intended lift. Since there is some end of the wing, the airflow tends to compensate the pressure difference which results in a vortex. This wing tip vortex reduces the lifting effect of the wing, increases the noise produced, increases energy loss due to dissipation in the airflow, and can be detrimental for other aircrafts closely following the airplane. The winglets mentioned are so to speak a baffle against the wing tip vortex.

Further, a problem of using winglets at the outer ends of main wings is that they have an impact on the mechanical stability of the wing and thus the airplane under flight conditions since they produce aerodynamic forces additional to the forces produced by the main wing. In particular, due to their position at the outer end, they can produce comparatively large torques in relation to inner parts of the wing, and/or their forces and torques are applied to parts of the main wing of usually much lighter construction compared to inner parts of the main wing. Consequently, it will often be necessary to reinforce the construction of the main wing in this respect so that a part of the economic and ecologic advantages of the winglets are compensated by the additional weight due to the reinforcement.

The problem of the present invention is to provide an improved wing and an improved airplane, having winglets.

SUMMARY

In view of this problem, the invention is directed to a wing for an airplane, extending from an inner wing end for being mounted to a base body of said airplane towards an outer wing end and having at least two winglets at the outer wing end, an upstream one of the winglets preceding a downstream one of the winglets in a flight direction (x), the upstream winglet having torsional elastic properties with regard to a longitudinal axis thereof such that a local angle of attack in a plane parallel to the flight direction between said upstream winglet's chord line and an airflow direction at said upstream winglet's leading edge is reduced under high aerodynamic load conditions, wherein a local angle of attack in a plane parallel to the flight direction (x) between said downstream winglet's chord line and an airflow direction at said downstream winglet's leading edge is increased under said high aerodynamic load conditions such that stall appears at said downstream winglet, and to an airplane having two such wings mutually opposed as well as to a use of a winglet set for mounting to a wing or to an airplane in order to produce such a wing or airplane.

The invention relates to a wing having at least two winglets wherein these winglets are fixed to an outer wing end of the wing. To avoid misunderstandings, the "wing" can be the main wing of the airplane which is (mainly) responsible for the required lift; it can, however, also be the horizontal stabilizer wing which is normally approximately horizontal as well. Further, the term "wing" shall relate to the wing as such as originating at the airplane's base body and extending therefrom outwardly. At an outer wing end of this wing, the at least two winglets are fixed and extend further, but not necessarily in the same direction. As principally already known in the prior art, a winglet can be inclined relative to the wing and/or bent. Preferably, the winglets do not extend inwardly from the outer wing end, however.

A basic idea of the invention is to use so-called morphing structures for at least an upstream winglet, namely dedicated torsional elastic properties of the winglet. The torsional elastic properties shall be tailored such that a local angle of attack, namely an angle between the winglet's chord line and an airflow direction in a plane parallel to a flight direction, is reduced under high aerodynamic load conditions. The local angle of attack shall mean an average angle of attack at the respective winglet along its spanwise length because the overall aerodynamic effect of the winglet is of interest. "Local" relates to the winglet (in particular to distinguish the angle from the overall angle of attack of the complete airplane). It is reasonable to refer to this angle of attack (as an average) because the angle of attack does usually not vary too much along the winglet's spanwise length.

High aerodynamic load conditions shall mean load conditions substantially above 1 g, in particular above 2 g. In other words, the gravitational forces are regarded to be increased by a certain factor and, correspondingly, increased forces downwards (basically perpendicular to the longitudinal axis of the airplane's fuselage) are considered. Such conditions can appear for example in a wind gust or in a sharp turn. Thus, high aerodynamic load means that the wing experiences a load, namely produces a lift, which is substantially higher than under normal flight conditions. Under normal flight conditions, the complete aerodynamic structure of the airplane is adapted to carry the airplane's weight. This is meant by load conditions of 1 g. However, a wind gust or a sharp turn can produce additional forces due to an acceleration which increase the effective lift or load of the wing. Consequently, the mechanical structure of a wing is tested and certified in view of such exceptional high load situations, for example for 2.5 g, in accordance with a so-called flight envelope and the borders thereof. Although in the actual overload cases such as sharp turns, the increased loads are variable in time, with regard to the design and the testing of the airplane structure, the high load case is considered as being static, generally.

The inventors found that the problem with additional winglets can be an additional lift contribution which can be detrimental under high load conditions of respective mechanical limits of the overall construction. If, however, the winglet shows an elastic passive torsional reaction to such a high load, the aerodynamic properties can be changed thereby. In particular, if the angle of attack is reduced compared to a (fictional) winglet without such torsional properties, the winglet produces substantially less lift.

On the other hand, the invention is directed to at least two sequential winglets at the outer wing end. The inventors found that it is preferable not to use the same concept for the downstream winglet but to bring the downstream winglet into stall conditions under such high load. Stall means that the airflow does no longer adhere to the aerodynamic surfaces but a turbulent and usually instationary flow is created. Under these conditions, a lift produced is substantially decreased. Thus, also for the downstream winglet, the respective contribution to critical forces and torques can be decreased.

For airplane wings, stall is usually regarded to be dangerous because lift is mandatory for an airplane. This, however, does not apply to a winglet. Further, stall produces drag, naturally, and thus is not economic. The present invention contemplates stall conditions for the downstream winglet under exceptional conditions, though, namely heavy aerodynamic load. Economy is not a major aspect, then, since such conditions appear rarely and are dominated by aspects of safety and control.

Further, the drag forces have a direction with a small angle to the flight direction. The main wing and the winglets are comparatively very stable in this direction, anyway, so that drag forces are not critical with regard to structural stability.

One could have considered using the same mechanism for the downstream winglet as used for the upstream winglet, namely to reduce the angle of attack also for the downstream winglet. However, since the downstream winglet is arranged in a sequence with regard to the upstream winglet, namely downstream thereof, though inclined thereto, it experiences the downwash of the upstream winglet and thus also the effect of the morphing movement thereof to some extent. This means that the direction of the airflow approaching the downstream winglet is redirected to a lower extent by the upstream winglet (there is less downwash) as a consequence of the morphing thereof so that the morphing of the upstream winglet can induce stall conditions at the downstream winglet.

With regard to a reduction of the angle of attack due to morphing on the one hand and stall conditions on the other hand, it should be clarified that this applies at least for a majority of the respective spanwise length of the winglets and, naturally, to the respective local chord line and local airflow direction ("local" here being meant along the winglets' spanwise length). In particular, the statements with regard to morphing shall apply for at least 50% and preferably at least 60%, 70% or even at least 80% of the spanwise length of the respective winglet. The same applies analogously (but independently) to the statements with regard to the stall conditions.

Further, it should be clarified that under certain circumstances, a "lift" produced by a winglet can be a critical force and can create a critical torque even if not contributing to the overall lift of the airplane. For example, if a winglet is directed more or less upwardly, the "lift" created thereby (due to its aerodynamic function) can have a major horizontal component not contributing to the overall airplane's lift but nevertheless producing a torque, in particular in a mounting region between the winglet and the main wing and in the outer part of the main wing.

Actually, in a preferred embodiment, the downstream winglet shall not show any substantial torsional elastic deformation under the high aerodynamic load. If the downstream winglet showed a similar torsional response as the upstream winglet, but to a lower extent, stall conditions could still be possible due to the change of downwash, but would be somewhat more difficult to achieve. Therefore, the third winglet is preferably relatively rigid as regards torsion. This means that under heavy load conditions of 2.5 g, the torsional elastic deformation of the downstream winglet shall be lower than 0.3° in average along the spanwise length of the downstream winglet and even more preferably 0.2° or 0.1° in average at most.

On the other hand, the desired morphing torsion of the upstream winglet shall preferably be at least 0.5° in average along the spanwise length thereof under 2.5 g conditions and even more preferably at least 0.6° or 0.7°.

Another preferred implementation of the invention, however, contemplates to enhance the appearance of stall at the downstream winglet by a morphing of this downstream winglet, but in an opposite torsional sense. This means that the stall conditions can be enhanced by an adaption of the downstream winglet to increase the respective angle of attack under heavy load conditions (in contrast to a decrease for the upstream winglet). Thus, the angle of attack at the downstream winglet is not only increased due to a change of the airflow arriving at the downstream winglet but, further, due to the just mentioned morphing effect (with inverted sense) appearing here.

With regard to this morphing of the downstream winglet, it shall preferably be more than 0.3° (in average along the spanwise length) but not necessarily as pronounced as the morphing of the upstream winglet. It is even possible to achieve stall conditions without any torsional morphing of the downstream winglet so that it is meant to enhance the appearance of stall, but not necessarily to be the only cause therefore.

In the literature, proposals for morphing wing parts can be found wherein the wing parts are articulated and (actively or passively) moved as a whole, i.e. with a "sharp" transition region or interface. This means that for example the torsional deformation of the upstream winglet would appear, with regard to the spanwise length, so to say in a concentrated manner across a slit or another separation between the torsionally moving winglet or winglet part and a non-moving winglet part or wing part. This is also possible with the present invention, naturally, but not preferred. The inventors regard transitions with a slit to be problematic for different reasons, such as cleanliness, sensitivity against humidity, ice and other climate conditions, aerodynamically disadvantageous edges etc. Instead, the desired morphing shall appear in a more distributed manner along the spanwise length and the aerodynamic hull of the winglet shall participate therein.

If the torsional elastic response according to the invention is achieved by a somewhat "soft" torsional characteristic of the mechanical structure of the winglet, it is normally distributed along the spanwise length of the winglet more or less evenly. Such morphing characteristics are adequate for adapting to many "normal flight" situations, for example because the winglet shall perform in a tip vortex of the main wing wherein the airflow direction varies continuously with the distance from the main wing tip. Such an "even" (for example linear) distribution of the morphing along the spanwise length of the winglet performs well for the present invention, too.

However, more preferred is a stronger torsional deformation near the root of the winglet compared to its tip. Then, the average torsional angle along the spanwise length can be enhanced because a torsional deformation near the root has an impact on the local angle of attack of a comparatively long winglet part outwardly thereof. This applies, as other statements with regard to morphing of winglets, to the upstream and/or downstream winglet, preferably at least to the upstream winglet (in particular if the downstream winglet is torsionally rigid).

Consequently, it is preferred that the inner 50% of the spanwise length of the morphing winglet show a more pronounced torsional response than the outward 50% thereof. Even more preferably, this applies for the inner 40% (compared to the outer 60%), for the inner 30% (compared to the outer 70%), or even for the inner 20% (compared to the outer 80%) of the spanwise length of the winglet.

This can be achieved by tailoring the mechanical structure of the winglet torsionally more elastic (or softer) in a proximal (near to the root) portion compared to a distal portion. For example, the dimensions of structural beams or spars could be varied. For example, a substantially vertical spar could be slimmer in a proximal portion to be torsionally more elastic. Further, in a preferred embodiment, there is a single structural member, for example a spar, in a proximal portion, and a plurality of structural members, such as spars, in a distal portion. In particular by interconnecting the plurality of spars by structural members, such as ribs, substantially along the flight direction, they are torsionally much stiffer than a single member.

Preferably, a single inner structural member can be "divided" into at least two structural members more outwardly (in the spanwise direction) in order to create the above plurality of structural members in the distal portion. In other words, the inner single structural member and the outer plurality thereof are preferably formed integrally and have a transition into each other.

In particular, such a single structural member can be useful to position a centre (or rotational axis) of the torsional movement. If it is positioned more or less centrally or even nearer to the leading edge of the winglet (in the flight direction), then, due to the sweepback angle, a morphing movement in the sense of reducing the local angle of attack will result, normally. If, however, such a single structural member is positioned quite near to the trailing edge, the opposite may be the case which may be intended for the downstream winglet as explained.

As already mentioned, the invention contemplates an elastic response of the winglet to high load conditions. In other words, the invention contemplates passive morphing. Preferably, a wing according to the invention does not comprise any active actuators for morphing the winglets, neither in the winglets nor in the main wing's outer part. Such actuators are frequently contemplated in the prior art and in the literature. They are regarded to be disadvantageous for the present invention because of their additional weight, technical complexity, and also because a passive elastic response is fast and responds to excess loads in a real-time manner.

It is quite obvious that a certain passive elastic response of winglets in a bending (but not torsional) sense appears under varying loads such as main wings bend depending on the load. This bending varies the so-called dihedral angle. The inventors have found that this bending is of minor importance for the reduction of lift of an upstream winglet and the appearance of stall for a downstream winglet. Consequently, such a bending may appear but is not sufficient as such to achieve the effects intended by the invention. In particular, the torsional movement intended by the invention can be achieved by such a bending wherein a leading edge of a winglet bends less than a trailing edge so that a torsion is induced.

So far, an upstream winglet and a downstream winglet have been explained. This has not been meant to exclude further winglets. Instead, the statements for the upstream winglet relate to at least one upstream winglet, and statements for the downstream winglet relate to at least one downstream winglet. However, preferably there are no more than three winglets and most preferably exactly three winglets per wing. Here, it is even more preferred that the statements for the upstream winglet relate to the middle winglet as well, i.e. to two upstream winglets, whereas only one (the last) downstream winglet shall experience stall conditions, as explained.

In particular, the inventors have found that the third winglet downstream of two morphing winglets experiences a relatively strong variation in downwash compared to a middle winglet. This does also depend on the relative length of the winglet (in the spanwise direction). It is easier to achieve stall conditions downstream of a longer winglet than if the directly preceding winglet is shorter than the one to go into stall conditions. Preferably, in the three winglet case, the middle winglet is longer than the most upstream winglet whereas the most downstream winglet is shorter than the middle winglet.

However, in case that the most upstream winglet is the longest one, stall conditions of two succeeding winglets could also be contemplated.

It might be advantageous to use a stall strip to facilitate, trigger, or enhance the appearance of stall at the downstream winglet. A stall strip is known as such to the skilled person and basically consists in an additional strip including a somewhat pronounced edge to be positioned at or near the leading edge or a part thereof. Instead or additionally, the leading edge or another part of the downstream winglet could also be tailored to have a comparatively sharp edge by its original shape, in other words to implement a stall strip in an integrated manner.

A further preferred aspect of the invention is to use a winglet set as described to upgrade an existing airplane. Thus, an airplane wing originally having no winglets or smaller ones or a winglet-like structure at the outer end such as a so-called fence, can be provided with a winglet structure according to the invention, in particular with two or three winglets. Therefore, an original part of the wing can be dismounted, for example a fence and a corresponding transition structure to the main wing ("fairing"), and can be substituted by a winglet set including another fairing.

It is particularly advantageous to use the load reduction concept of this invention with existing wings and existing airplanes in order to minimize or even avoid reinforcements therein. This applies in particular to high load conditions such as 2.5 g or the like which usually define the limits of the mechanical structure of an airplane. If the additional forces and torques implied by winglet sets can be reduced in this manner, such winglet sets can be applied where otherwise no winglet sets would be applicable or at most smaller ones.

In this sense, the invention also relates to a winglet set for upgrading and its respective use. It further relates to a winglet set also for a first (original) equipment of an airplane, which is adapted for being mounted to a defined interface such as an outer rib in the main wing and wherein the orientation of the winglet set is defined by such an interface.

Beside that, the invention relates to an airplane having two wings on opposed sides, each with a winglet set as described.

The invention is particularly advantageous with a certain winglet geometry found by the inventors. Therein, the upstream or "first" winglet and a succeeding "second" winglet are mutually inclined, as seen against the flight direction, by a relative dihedral angle delta 1,2 in an interval from 5° to 35°, wherein said first winglet is upwardly inclined relative to said second winglet, wherein said relative dihedral angle is defined as the opening angle at said winglets' root of an isosceles triangle having one vortex on the root, namely at a splitting point of both winglets in horizontal direction and in the middle of the positions of leading edges of said winglets in vertical direction, one vortex on the leading edge of said first winglet and one vortex on the leading edge of said second winglet, as seen in a projection against said flight direction, said triangle having a variable length of the two equal triangle sides and said dihedral angle interval being valid for at least 70% of the equal side length along a shorter one of said first winglet and said second winglet.

The inventors have found that a mutual inclination of two succeeding winglets as seen against the flight direction, leads to advantageous results in a quantitative assessment by computer fluid dynamics calculations. In particular, it has proven to be advantageous to incline the first winglet relative to, for example and preferably, more upwardly than, the succeeding winglet. Therein, the difference in inclination, the difference in the so called dihedral angle (relative dihedral angle) should be moderate, namely not more than 35°. On the other hand, a certain relative dihedral angle should be observed and should thus not be smaller than 5°. More preferred lower limits of the relative dihedral angle interval are (in the following order) 7°, 9°, 11°, 13°, and 15°, whereas more preferred upper limits are 33°, 31°, 29°, 27°, and 25°. Thus, an optimum should be in the region of 20°.

The results of the inventors show that this relative dihedral angle is more important than the absolute dihedral angles which might be due to the fact that the air flow geometry has a certain degree of rotational symmetry about an axis parallel to the flight direction at the end of the main wing and thus at the root of the winglets. This is, naturally, only an approximative statement but nevertheless, the relative dihedral angle is regarded to be more important than the absolute one.

The relative dihedral angle is defined herein in an average sense, namely by means of an isosceles triangle between vertices. One vortex shall be on the root and one respective vortex on each winglet. More precisely, the triangle is defined in a projection against the flight direction and the vortex on the root shall be, as regards the horizontal dimension, at a splitting point of both winglets, i.e. where both winglets are separated in the horizontal dimension as seen vertically. As regards the vertical dimension, the root vortex shall be in the middle of the positions of the leading edges (the most upstream edges) of both winglets at the just mentioned horizontal location or, if they coincide there, at that position. Since this region is subject to smooth transition shapes in order to avoid aerodynamic disturbance, the leading edge so to say loses its identity in this transition region (the so called fairing between the winglets and the main wing end). Therefore, the leading edges shall be extrapolated in the following manner: an inner portion of 10% of the spanwise length of the winglet (defined in more detail in the following) is disregarded and an outer portion between 90% and 100% is disregarded as well for other reasons (namely possible roundings as explained in the embodiment). The remaining 10%-90% represent a proper leading edge which can be extrapolated. Should the leading edge not be straight, an average line can be used for extrapolation.

The vertices on the winglets themselves shall be on their leading edges, respectively. Consequently, the opening angle of this triangle, namely the angle between the two equal sides, is the relative dihedral angle.

The triangle definition includes a variable length of the equal sides within the limits imposed by the shorter one of both winglets. In terms of this variable side length concept, the defined relative dihedral angle intervals shall be valid for at least 70% of the side length, more preferably for at least 75%, 80%, 85%, or even 90% of the side length. In other words: If a minor portion of the winglets does not obey to the relative dihedral angle interval, this is not too detrimental for the invention, whereas, of course, 100% within the interval are the best case.

The variable side length concept takes into account that the winglets need not be straight (in the perspective against the flight direction) but can also be completely or partially bent, e.g. along a circular portion as shown for the first winglet in the embodiment. The winglets could also be polygonal (with limited angles) or shaped otherwise so that the relative dihedral angle varies along their spanwise length. Further, even with straight winglets (as seen against the flight direction), their leading edge lines need not necessarily meet at the root vortex as defined above which could lead to slight variations of the relative dihedral angle along their length. However, with straight winglets, the relative dihedral angle as defined by the triangle concept is at least approximately just the angle visible against the flight direction.

The above and all following descriptions of the preferred geometric shape of the wing and the winglets relate to what the expert understands as an "inflight" shape, namely under 1 g conditions. In other words, these explanations and definitions relate to the "normal" flight conditions in which the aerodynamic performance is actually meant to be and is relevant, which basically is the typical travel velocity (on distance) at the typical travel altitude. The expert is familiar with that there is another "jig shape" which is meant to be the shape of the wing and the winglets in a non-flying condition, i.e. without any aerodynamic forces acting thereon. Any difference between the jig shape and the in-flight shape is due to the elastic deformation of the wing and the winglets under the aerodynamic forces acting thereupon. The precise nature of these elastic deformations depends on the static mechanical properties of the wing's and winglets' construction which can be different from case to case. This is also a familiar concept to the mechanical engineer and it is straightforward to calculate and predict such deformations for example by finite element calculations with standard computer simulation programs.

The same applies, naturally, to the difference between the normal flight conditions, namely the in-flight shape and the heavy load conditions, such as for 2.5 g. Again, finite element calculations can be used to calculate the elastic deformations whereas the earlier mentioned computer fluid dynamics calculations can be used to determine the aerodynamic forces. Both can be combined in iterations.

Further, the terms "horizontal" and "vertical" relate to a mounted state of the wing at an airplane, wherein "vertical" is the direction of gravity and "horizontal" is perpendicular thereto.

The inclinations of the winglets relative to each other as explained above have proven to be advantageous in terms of a trade-off between two aspects. On the one hand, a relative dihedral angle of zero or a very small quantity leads to that a second winglet is subject to an airstream not only influenced by the first winglet, but also to a turbulent or even diffuse airflow in the wake of the first winglet, inhibiting a proper and pronounced aerodynamic performance such as the production of a lift and/or thrust contribution as discussed below. In contrast, a second winglet might produce too much drag compared to what it is actually intended for in normal operation, this being lift, thrust, vortex cancellation or whatever.

On the other hand, too large relative dihedral angles so to say "decouple" the winglets from each other whereas the invention intends to use a synergetic effect of at least two winglets. In particular, the invention preferably aims at conditioning the airflow by the first winglet for the second winglet. In particular, one aspect of the invention is to use the inclined airflow in the region of the tip vortex of the wing in a positive sense. A further thought is to produce an aerodynamic "lift" in this inclined airflow having a positive thrust component, i.e. a forwardly directed component parallel to the flight direction of the airplane. Herein, it should be clear that the "lift" relates to the aerodynamic wing function of the winglet. It is, however, not necessarily important to maximize or even create a lifting force in an upwardly directed sense, here, but the forward thrust component is in the centre of interest.

In this respect, the inventors found it advantageous to "broaden" the inclined airflow in order to make an improved use thereof. This makes sense because a wingtip vortex is quite concentrated so that substantial angles of inclination of the airflow direction (relative to the flight direction) can be found only quite near to the wingtip. Therefore, due to the "broadening" of the region of inclined airflow, the second winglet can better produce a thrust component therefrom, according to a preferred aspect.

The first winglet is thus intended for "splitting" the wingtip vortex of the wing by "shifting" a part thereof to the winglet tip, i.e. outwardly. Consequently, a superposition of the winglet-induced tip vortex (winglet tip vortex) and the vortex of the "rest of" the wing (said wing being deeper in the direction of flight than the winglet) results.

Preferably, the winglets as represented by their respective chord line (the line between the leading edge and the most downstream point of the airfoil) shall also be inclined in a certain manner as regards a rotation around a horizontal axis perpendicular (instead of parallel) to the flight direction. The rotation angle is named angle of incidence and shall be positive in case of a clockwise rotation of the winglet as seen from the airplane's left side and vice versa from its right side in normal operation (1 g). In this sense, an angle of incidence interval for the first winglet from −15° to −5° is preferred, more preferably in combination with an angle of incidence interval for the second winglet from −10° to 0°. These intervals relate to the root of the winglets and the angle of incidence interval is defined in a variable sense in linear dependence of the position along the spanwise length of the winglet. It shall be shifted from the root to the tip of the respective winglet by +2° which leads to an interval from −13° to −3° for the first winglet and from −8° to +2° for the second winglet at their respective tip. This does not necessarily imply that the actual angle of incidence of a certain implementation must be "twisted" which means show a varying angle of incidence in this sense (under 1 g conditions). An actual implementation can also be within the intervals defined without any twisting. However, since the inventors take into regard the variation of the airflow in dependence of the distance from the root of the winglets, a moderate dependence of the interval definition in this sense is appropriate (in other words: the centre of the interval and the borders thereof are "twisted").

The angle of incidence is defined as above between the respective winglet's chord line and a chord line of the wing as such (the main wing). This latter chord line is referred to near to that position (in horizontal direction perpendicular to the flight direction) where the wing is split into the winglets, in other words where the winglets separate when going more outwardly. Since at the splitting position, also the main wing can already be deformed somewhat (in terms of a fairing) in order to provide for a smooth transition to the winglets, the chord line shall be referred to a little bit more inward, namely 10% of the main wing spanwise length more inward. The same applies vice versa to the winglet so that the chord line is referred to 10% more outward of the splitting position.

More preferred lower limits of the incidence angle interval for the first winglet at its root are −14°, −13°, −12°, and −11°, and at its tip +2° additional to these values, whereas more preferred upper limits at the root of the first winglet are −6°, −7°, −8°, −9° and, again, +2° more at the tip. Analogously, more preferred lower limits for the second winglet at the root are −9°, −8°, −7°, −6°, and more preferred upper limits are −1°, −2°, −3°, −4°, and again +2° more at the tip, respectively.

Again, the angle intervals defined shall be valid for at least 70%, more preferably at least 75%, 80%, 85%, and even 90%, of the spanwise length of the respective winglet. In other words: minor portions of the winglets not obeying to these criteria are not of essence.

As regards the angle of incidence of the first winglet, it is favourable to use the interval defined in order to minimize the drag thereof and to produce not too much downwash of the airstream downstream of the first winglet. Too much downwash would hinder the function of the second winglet which is based on the inclination of the airflow due to the already described vortex. The interval given for the second winglet has proven to be advantageous in terms of an optimized thrust contribution. In many cases, the actual angle of incidence of the first winglet will be smaller than that of the second winglet as can also be seen from the intervals given, because the airstream downstream of the first winglet has already been changed thereby. In any case, the intervals defined and, in most cases, a somewhat smaller angle of incidence of the first winglet compared to the second winglet are general results of the computer fluid dynamics simulations performed.

Preferably and as already mentioned, the invention also comprises a third winglet downstream of the second winglet, and more preferably, the invention is limited to these three winglets (per wing).

More preferably, the third winglet obeys to a relative dihedral angle interval relative to the second winglet as well, namely from 5° to 35° with the same more preferred lower and upper limits as for the relative dihedral angle between the first and the second winglet (but disclosed independently thereof). This dihedral angle difference is to be understood in the second winglet being (preferably more upwardly) inclined relative to the third winglet. The definition of the relative dihedral angle is analogous to what has been explained above but, naturally, relates to a second and a third winglet, here.

As already explained with regard to the relation between the first and the second winglets and their relative dihedral angle, also here, in the retrospective relation between the second and the third winglets, it is neither favourable to position the third winglet directly "behind" the upstream second winglet, nor is it favourable to decouple them in an aerodynamic sense. Instead, by means of a relative dihedral angle in the interval given, the third winglet will again be in the position to produce a synergetic effect downstream of the first and the second winglets, and in particular, as preferred in this invention, to produce a thrust contribution once more.

Still more preferred, the third winglet also is subject to a limitation of the angle of incidence in an analogous manner as explained above for the first and for the second winglet including the explanations as regards a definition of the chord line. Here, for the third winglet, the intervals shall be from −7° to +3° at the root and, again, +2° more at the tip and the linear interpolation therebetween of the interval. More preferred lower limits for the interval of the incidence angle for the third winglet are −6°, −5°, −4°, −3°, and more preferred upper limits are +2°, +1°, 0°, −1°, at the root and +2° more at the tip. Again, the intervals for the relative dihedral angle and the angle of incidence shall be valid for preferably at least 70% of the shorter one of the second and third winglet and for the spanwise length of the third winglet, respectively. Again, more preferred limits are at least 75%, 80%, 85%, 90%.

The function of the above choice of the angle of incidence of the third winglet is similar to that one of the second winglet, namely that the airstream to which the third winglet is subjected, has already been changed by the upstream two winglets, and that the third winglet is intended to produce a thrust contribution therein together with a minimized drag of the complete system.

In a further preferred implementation, a so called sweepback angle of the two or three winglets is in an interval from −5° to 35°, respectively, relative to the sweepback angle of the main wing (a positive value meaning "backwards"). In other words, the winglets can be inclined in an arrow-like manner backwardly, as airplane wings usually are, preferably at least as much as the main wing or even stronger. Therein, the sweepback angle need not be the same for all three winglets. More preferred lower limits are 4°, −3°, 2°, −1°, whereas more preferred upper limits are 30°, 25°, 20°, 15°. As just noted, the sweepback angle is related to the inclination of the leading edge of the respective winglet compared to a horizontal line perpendicular to the flight direction. This can be defined in a fictious horizontal position of a winglet (the dihedral angle and the angle of incidence being zero and in an unrolled condition of any bending). Alternatively, the sweepback angle can be defined by replacing the actual extension of the winglet in the horizontal direction perpendicular to the flight direction (as seen vertically) by the spanwise length b thereof defined somewhere else in this application.

Should the leading edge not be linear, the sweepback angle relates to an average line with regard to the non-linear leading edge in the range from 20% to 80% of the respective span of the winglets. This limited span range takes into account that the leading edge might be deformed by rounded corners (such as in the embodiment) at the outward end and by transitions at the so called fairing at their inner end. Since the sweepback angle is very sensitive to such effects, 20% instead of 10% are "cut off" at the borders.

As regards the reference, the leading edge of the main wing, the range from 50% to 90% of its span and an average line in this range shall be taken into account. This is because the spanwise position of 0% relates, as usual, to the middle of the base body and thus is not in the main wing itself, and there is a so called belly fairing at the transition from the base body to the main wing which is not only configured to be a proper airfoil but is more a transition to the airfoil. Still further, an adaption of a sweepback angle of the winglets to the outer portion of the main wings is appropriate anyway.

The simulations done have shown that the results can be optimized by a somewhat enhanced sweepback angle of the winglets but that this angle should not be exaggerated. Since the sweepback angle has a connection to the usual speed range of the aircraft, it is a pragmatic and technically meaningful reference to start from the sweepback angle of the main wing.

The above explanations with regard to the relative dihedral angle are intentionally open with regard to their "polarity", in other words to whether a downstream winglet is inclined upwardly or downwardly with regard to an upstream winglet. In fact, the inventors have found that the aerodynamic performance is rather insensitive in this respect. However, it is preferred that the upstream first winglet is inclined more upwardly than the second winglet (with and without a third winglet). It is, further and independently, preferred that the third winglet, if any, is inclined more downwardly than the second winglet. The best results achieved so far are based on this concept as shown in the embodiment.

Although it has been explained above that the relative dihedral angle between the first and the second winglet (and also that between the second and the third winglet) is more important than the absolute values of the respective dihedral angles of the winglets, they are also preferred choices for the latter. For the first winglet, the respective dihedral angle interval is from −45° to −15°, more preferred lower limits being −43°, −41°, −39°, −37°, and −35°, whereas more preferred upper limits are −17°, −19°, −21°, −23° and −25°.

For the second winglet, all these values are shifted by +20° including the more preferred limits. The same applies to the third winglet, if any, in relation to the second winglet. Again, these angle intervals shall be valid for at least 70%, preferably at least 75%, 80%, 85%, or even 90% of the respective spanwise length of the winglet.

For the sake of clarity: The limitations of the relative dihedral angle explained above apply in this context. If, for example, the dihedral angle of the first winglet would be chosen to be −35°, the interval for this dihedral angle of the second winglet would be automatically limited to be not more than 0°. The relative dihedral angle definitions are dominant, thus. Further, the absolute dihedral angle is defined in a similar manner as the relative dihedral angle, the difference being that one of the equal sides of the isosceles triangle is horizontal instead of on the leading edge of one of the winglets.

It has been found that too low absolute values of the dihedral angle such as below −45°, and thus winglets oriented more or less upwardly can be disadvantageous because it is more difficult to provide for a proper and smooth transition (fairing) between the main wing's outer end and the winglet. Further, the numerical simulations have not shown any advantage for such very low dihedral angles. On the other hand, very large values, i.e. winglets directed strongly downwardly such as with a dihedral angle of more than 25°, can have the detrimental effect of reducing the ground clearance. Of course, the effect described for very low values is also valid for the very large values but, as can be seen from the difference between the borders of −45° and +25°, the ground clearance is usually a dominant aspect (whereas exceptions are existent, such as so called high-wing aircrafts being less sensitive with regard to ground clearance). Thus, dihedral angles from one of these limits to the other are generally preferred and even more preferred in the intervals defined above for the first, the second, and the third winglet.

As regards the respective length and spanwise direction of the winglets, certain proportions to the spanwise length of the (main) wing are preferred, namely from 2% to 10% for the first winglet, from 4% to 14% for the second winglet and from 3% to 11% for the third winglet, if any. Respective preferred lower limits for the first winglet are 2.5%, 3.0%, 3.5%, 4.0%, 4.5%, 5.0%. Preferred upper limits for the first winglet are 9.5%, 9.0%, 8.5%, 8.0%, 7.5%, 7.0%. For the second winglet, the more preferred lower limits are 5.0%, 6.0%, 6.5%, 7.0%, 7.5%, 8.0%, and more preferred upper limits for the second winglet are 13%, 12%, 11.5%, 11.0%, 10.5%, 10.0%. Finally, the more preferred lower limits for the third winglet are 3.5%, 4.0%, 4.5%, 5.0%, 5.5%, 6.0%, and more preferred upper limits are 10.5%, 10.0%, 9.5%, 9.0%, 8.5%, and 8.0%.

The spanwise length is herein defined as the distance from the root of the winglets, namely at the separation of the winglet from the neighbouring winglets (in case of the second winglet between the first and the third winglet, the innermost separation) to their outward end in a direction perpendicular to the flight direction and under the assumption of an angle of incidence and a dihedral angle of zero, i.e. with the winglet in a horizontal position. In case of an non-linear shape of the winglet, such as a curved part as with the first winglet in the embodiment, the spanwise length relates to a fictious straight shape (an "unrolled" condition) since such a bending is an alternative to a dihedral inclination. More precisely, it relates to a projection plane perpendicular to the flight direction and, therein, to the length of the wing in terms of a middle line between the upper and the lower limitation line of the projected winglet. For the main wing, the same definition holds but starting in the middle of the base body (in the sense of a half span). The length of the main wing is measured up to the separation into the winglets; it is not the length of the complete wing including the winglets.

As regards the above relative length intervals for the winglets, these sizes have proven to be practical and effective in terms of the typical dimensions of the tip vortex of the main wing which is of essence for the function of the winglets. Too small (too short) winglets do not take advantage of the full opportunities whereas too large winglets reach into regions with their respective winglet tips where the main wing's tip vortex is already too weak so that the inclined airflow cannot be taken advantage from for the full length of the winglets (in particular the second and third) and the broadening effect discussed above, as a particularly preferred concept of the invention, will possibly more produce two separated than two superposed vortex fields.

Further, there are preferred relations between the spanwise lengths of the winglets, namely that the second winglet preferably has a length from 105% to 180% of the first winglet. Likewise, it is preferred that the third winglet length is from 60% to 120% of the second winglet. Therein, more preferred lower limits for the first interval are 110%, 115%, 120%, 125%, 130%, 135%, and 140%, whereas more preferred upper limits are 175%, 170%, 165%, and 160%. More preferred lower limits for the second interval are 65%, 70%, 75%, whereas more preferred upper limits are 115%, 110%, 105%, 100%, 95%, and 90%.

In a more general sense, it is preferred that the second winglet is at least as long (spanwise) as the third winglet, preferably longer, and the third (and thus also second) winglet is at least as long and preferably longer as the first winglet. This is basically due to the fact that the second winglet should take full advantage of the broadened inclined airstream region as broadened by the first winglet in order to produce a maximum effect, and the third winglet shall, again, produce an analogous or similar effect, but will not be able to do so since energy has already been taken out of the airstream. Thus, it should be limited in size in order not to produce too much drag.

The above described length ratios between the winglets have an impact on that the invention prefers to use the stall concept for the third winglet. Since it is preceded not just by one but by two winglets, the second one being comparatively large, stall can quite easily be achieved. On the other hand, since the first winglet is usually shorter than the second winglet, a lift production by morphing is preferred for the second winglet.

Still further, the aspect ratio of the winglets is preferably in the interval from 3 to 7 wherein more preferred lower limits are 3.5 and 4.5 and more preferred upper limits are 6.5, 6.0, and 5.5. This relates, as any of the quantitative limitation herein, individually to each winglet and relates to a two winglet embodiment where there is comparatively much space in the chord line direction. For a three winglet embodiment, the aspect ratios can be somewhat higher and are preferably in the interval from 4 to 9 wherein preferred lower limits are 4.5 and 5.0 and more preferred upper limits are 8.5, 8.0, and 7.5. This relates, again, to each winglet individually.

Although higher aspect ratios are more efficient in an aerodynamic sense, they have a smaller area and thus, produce smaller forces (and thus a small thrust). In other words, within the already-described length limitation, a substantial winglet area is preferred. On the other hand, a too low aspect ratio increases the drag and decreases the efficiency in an amount that finally reduces the effective thrust by means of an increased drag. All in all, the CFD simulations repeatedly showed optimum values around 5.

The aspect ratio is defined as the double spanwise length of a wing (i.e. the full span of the airplane in case of a main wing), and likewise the double spanwise length of a winglet, divided by the chord line length, namely as an average value. To be precise, the definition in this application to cut-off the outer 10% of the spanwise length when assessing the chord line length, is valid also here to exclude an influence of a fairing structure and/or roundings of a winglet.

Preferred implementations of the invention can have certain root chord lengths for the winglets. The values are defined for two cases, namely for a set of exactly two and another set of exactly three winglets. For two winglets, the root chord length for the first winglet can be in the interval from 25% to 45% of the chord length of the main wing next to the splitting into the winglets (not at the root of the main wing).

In this case, for the second winglet, the respective preferred interval is from 40% to 60%. More preferred lower limits for the first winglet are 27%, 29%, 31%, and for the second winglet 42%, 44%, 46%, more preferred upper limits for the first winglet are 43%, 41%, 39%, and for the second winglet 58%, 56%, 54%.

The case of exactly three winglets has a preferred interval for the first winglet from 15% to 35% of the chord length of the main wing next to the splitting, and from 25% to 45% for the second winglet, and from 15% to 35% for the third winglet. More preferred lower limits for the first winglet are 17%, 19%, 21%, for the second winglet 27%, 29%, 31%, and for the third winglet 17%, 19%, 21%. More preferred upper limits for the first winglet are 33%, 31%, 29%, for the second winglet 43%, 41%, 39%, and for the third winglet 33%, 31%, 29%. The respective tip chord length of the winglets is preferably in an interval from 40% to 100% of the respective root chord length, wherein more preferred lower limits are 45%, 50%, 55%, 60%, and the more preferred upper limits are 95%, 90%, 85%, 80%.

Generally, these chord lengths take into account the available overall length, the advantageous size distribution between the winglets and the desired aspect ratio thereof. Further, a certain intermediate distance between the winglets in the flight direction is desired to optimize the airflow. As can be seen from the centers of the above intervals for the respective chord lengths, a length from 5% to 25%, preferably at least 10%, preferably at most 20%, of the available length are approximately used for this distance even near the root of the winglets, in total. This means that the respective chord lengths of the winglets preferably do not add up to 100%.

Still further, it is clear to the expert that some fairing (as the so called belly fairing at the transition between the base body and the main wing) is used in the transition region between the main wing's end and the winglets' roots. Therefore, also the chord length at the end of the main wing is referred to at a distance 10% inward from the splitting into the winglets (relative to the length in terms of the half span of the main wing) to be clearly out of this transition. In the same manner, the root chord length of the winglets is referred to at a position 10% outward of the separation into the winglets to be well within the proper airfoil shape of the winglets. The same applies to the position of the chord line in relation to for example the angle of attack.

Still further, in some wings and winglets, the outer front corner is "rounded" as in the embodiment to be explained hereunder. This rounding can be done by a substantial reduction of the chord length in the outermost portion of the winglet but is not regarded to be a part of the above-mentioned feature of the relative chord length at a winglet tip in relation to a winglet root. Therefore, the chord length of the winglet at 10% of the winglet's length inward of its tip is referred to, here.

A preferred category of airplanes are so called transport category airplanes which have a certain size and are meant for transportation of substantial numbers of persons or even goods over substantial distances. Here, the economic advantages of the invention are most desirable. This relates to subsonic airplanes but also to transonic airplanes where supersonic conditions occur locally, in particular above the main wings and possibly also above the winglets. It also relates to supersonic airplanes having a long distance travel velocity in the supersonic region.

In both cases, with regard to the complete airplane and with regard to the upgrade of existing airplanes, a first simulated choice for the airplane has been the Airbus model A 320. Therein, an outward part of the conventional wings, a so called fence, can be demounted and replaced by a structure according to the invention having two or three winglets.

BRIEF DESCRIPTION OF THE DRAWINGS

The invention will hereunder be explained in further details referring to exemplary embodiments below which are not intended to limit the scope of the claims but meant for illustrative purposes only.

FIG. 5 is a schematic front view of a wing tip according to the invention including two winglets;

FIG. 6 is a diagram showing two graphs of an inclination angle dependency on distance relating to FIG. 5;

FIG. 8 is a front view of the same winglets to explain the delta angles;

FIG. 12 is a side view to explain reference lines used for simulations in the embodiment;

FIG. 13 is a top view to illustrate the same reference lines;

FIGS. 30 and 31 show graphs of an actual twist and bending of these two winglets along their spanwise length;

FIG. 39 illustrates a rounded and a sharp leading part of an airfoil in section.

DETAILED DESCRIPTION

Figure 1:
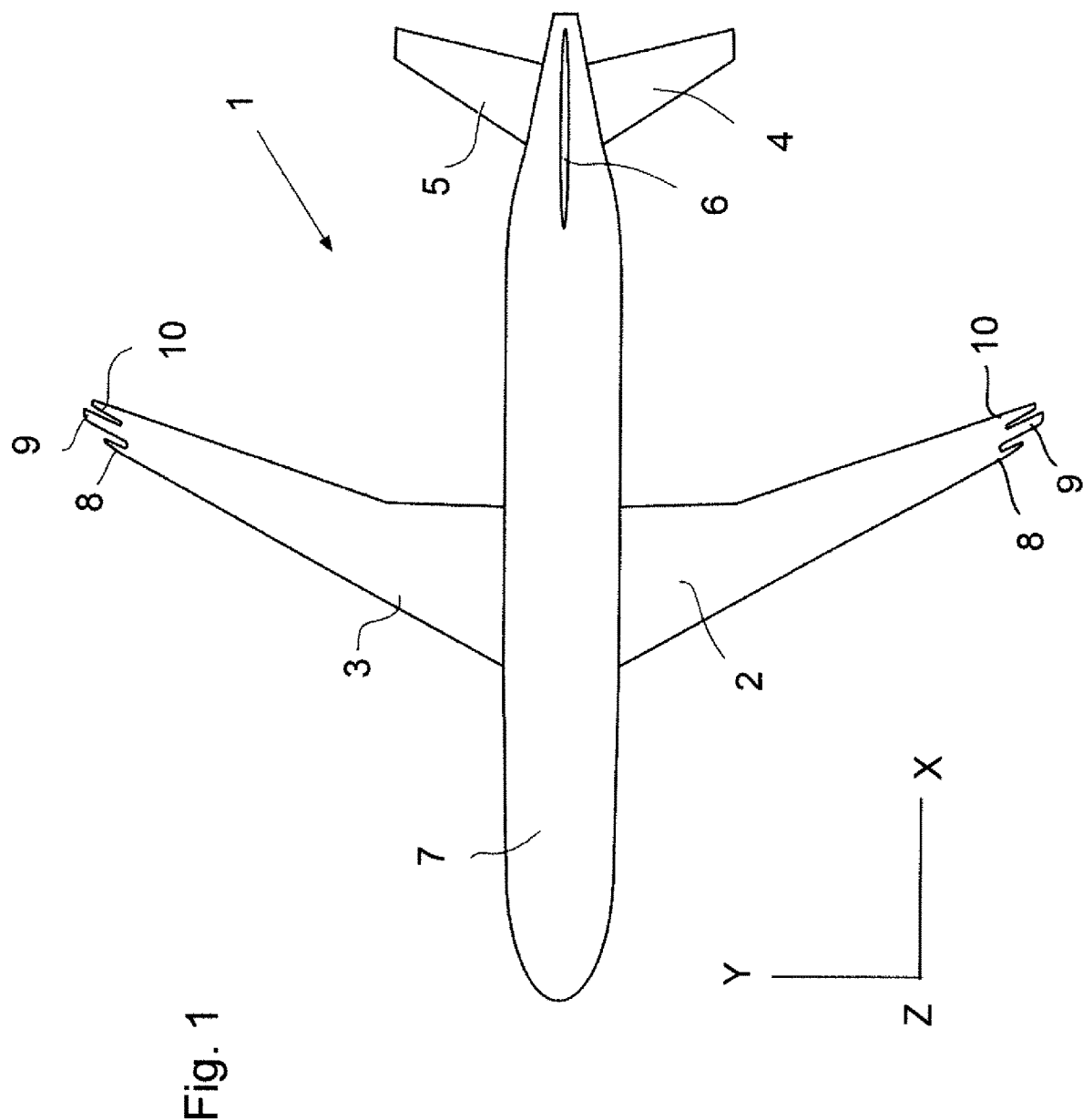
FIG. 1 shows a plan view of an airplane according to the invention including six winglets schematically drawn.

FIG. 1 is a plan view of an airplane 1 having two main wings 2 and 3 and two horizontal stabilizers 4 and 5 as well as a vertical tail 6 and a fuselage or base body 7. FIG. 1 shall represent an Airbus model A 320 having four propulsion engines, not shown here. However, in FIG. 1, the main wings 2 and 3 each have three winglets 8, 9, 10, respectively. Two respective winglets sharing a reference numeral are mirror symmetrical to each other in an analogous manner as both main wings 2 and 3 and the base body 7 are mirror symmetric with regard to a vertical plane (perpendicular to the plane of drawing) through the longitudinal axis of the base body.

Further, an x-axis opposite to the flight direction and thus identical with the main airflow direction and a horizontal y-axis perpendicular thereto are shown. The z-axis is perpendicular and directed upwardly.

Figure 2:
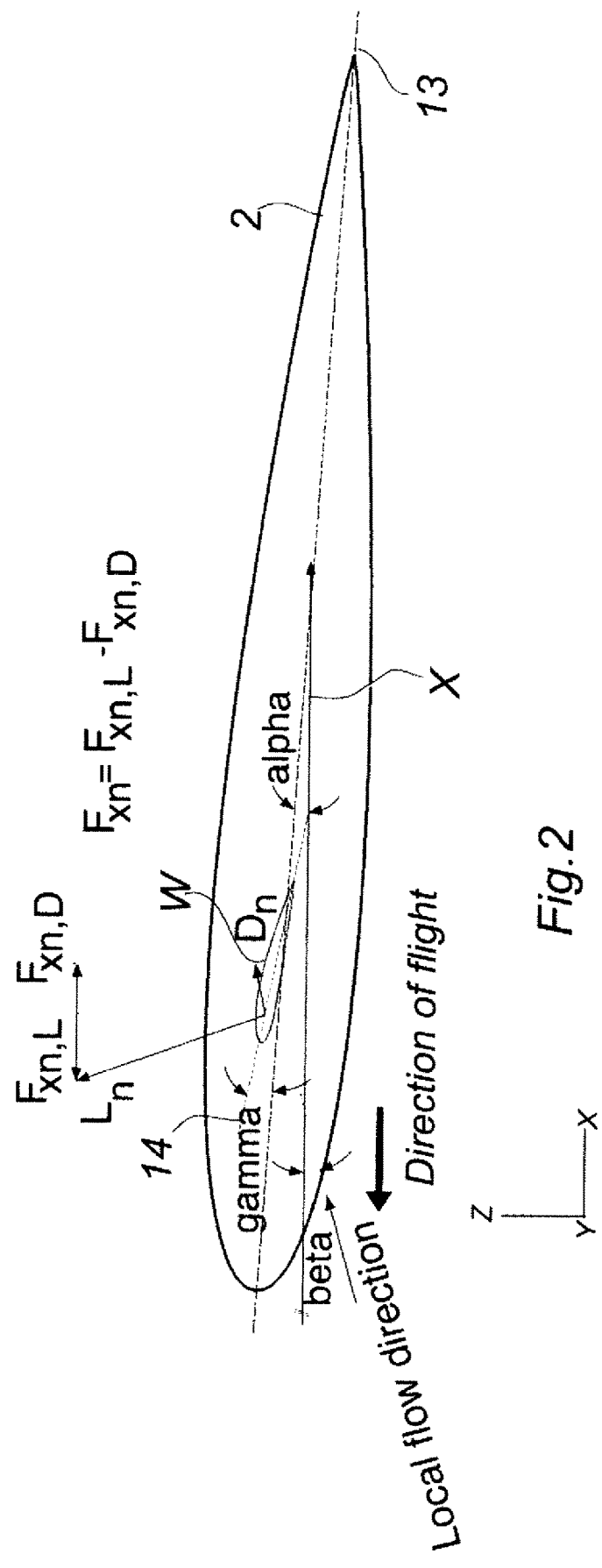
FIG. 2 is a schematic diagram for explaining the creation of a thrust by a winglet.

FIG. 2 is a schematic side view of an airfoil or profile (in FIG. 2 a symmetric standard wing airfoil, in case of the A 320 an asymmetric airfoil) of a main wing 2 and an airfoil (for example NACA 2412, a standard asymmetric wing airfoil or RAE 5214, an asymmetric wing airfoil for transonic flight conditions) of an exemplary winglet W which is just for explanation purposes.

A solid horizontal line is the x-axis already mentioned. A chain-dotted line 13 corresponds to the chord line of the main wing 2 (connecting the front-most point and the end point of the profile), the angle alpha there between being the angle of attack of the main wing.

Further, a bottom line 14 of the profile of winglet W (which represents schematically one of winglets 8, 9, 10) is shown and the angle between this bottom line 14 and the bottom line of the main wing profile is gamma, the so-called angle of incidence. As regards the location of the definition of the chord lines along the respective span of the wing and the winglets reference is made to what has been explained before.

Figure 3A:
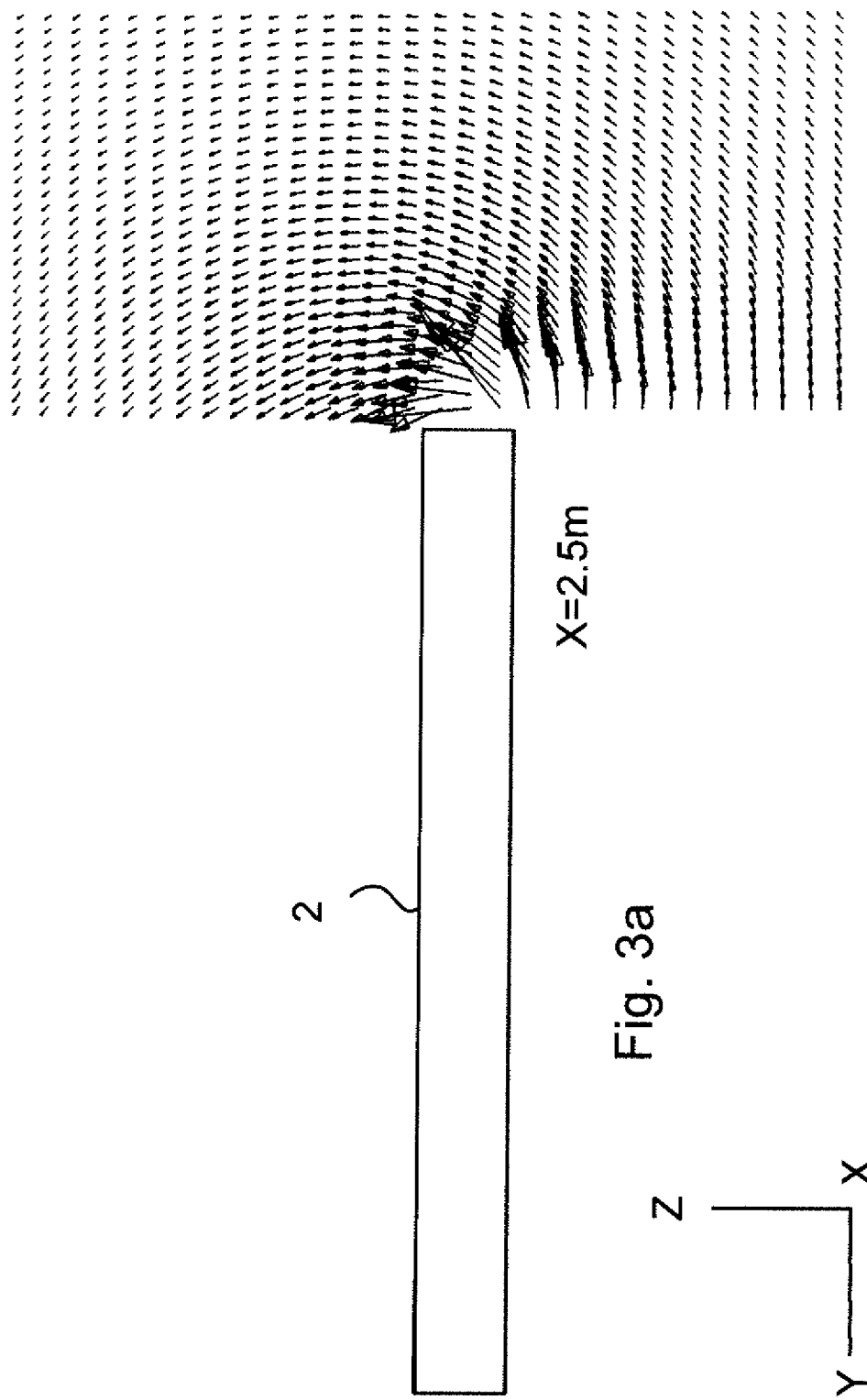
FIG. 3a, b are schematic illustrations of the air velocity distribution in a tip vortex.

FIGS. 3a and b illustrate a tip vortex as present at any wing tip during flight. The fields of arrows at the right sides symbolize the component of the airflow velocity in the plane of drawing as regards direction and magnitude (arrow length). FIG. 3a shows a point of x=2.5 m (x=0 corresponding to the front end of the wing tip) and FIG. 3b relating to a downstream location of x=3.4 m. It can be seen that the tip vortex "develops with increasing x" and that the vortex is quite concentrated around the wing tip and quickly vanishes with increasing distance therefrom. This statement relates to almost any direction when starting from the wing tip with no qualitative but also small quantitative differences.

Further, FIGS. 3a and b illustrate that the wing tip vortex principally adds some upward component to the airflow velocity together with some outward component in the lower region and some inward component in the upper region. With this in mind, it can be understood that FIG. 2 shows a local flow direction having an angle beta to the flight direction x. This local flow direction (components perpendicular to the plane of drawing of FIG. 2 being ignored) attacks the symbolic winglet W and causes a lift $L_n$ thereof as shown by an arrow. This lift is perpendicular to the flow direction by definition. It can be seen as a superposition of a vertically upward component and a positive thrust component $F_{xn,L}$.

Principally the same applies for the drag $D_n$ of the winglet W. There is a negative thrust component of the drag, namely $F_{xn,D}$. The thrust contribution of the winglet W as referred to earlier in this description is thus the difference thereof, namely $F_{xn}=F_{xn,L}-F_{xn,D}$ and is positive here. This is intended by the invention, namely a positive effective thrust contribution of a winglet.

Figure 4:
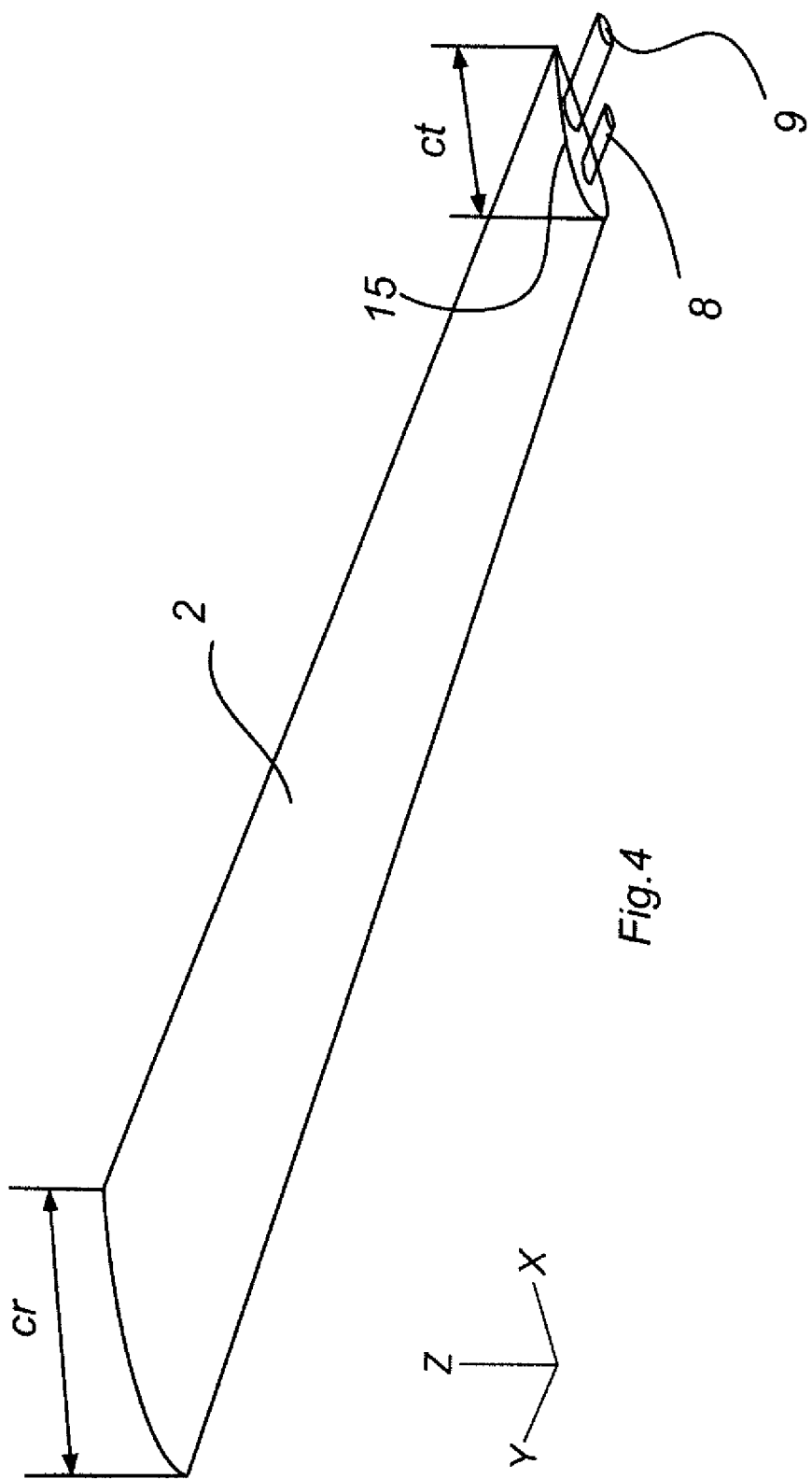
FIG. 4 is a schematic perspective view of a wing according to the invention.

FIG. 4 shows the main wing 2 and exemplary two winglets of FIG. 2, namely 8 and 9. Wing 2 is somewhat inclined relative to the y-axis by a so called sweepback angle and has a chord line length decreasing with the distance from the base body 7 from a root chord line length cr to a tip chord line length ct. At a wing outer end 15, winglets 8 and 9 are mounted, compare also FIG. 5.

FIG. 5 shows the wing 2 and the winglets 8 and 9 in a projection on a y-z-plane and the length b of main wing 2 (b being measured from the centre of base body 7 at y=0 along the span of main wing 2 as explained before) and respective lengths b1 and b2 of winglets 8 and 9, respectively. For simplicity, wing 2 and winglets 8 and 9 are shown straight and horizontal, only. However, an inclination relative to wing 2 around an axis parallel to the x-axis would not lead to qualitative changes.

FIG. 6 shows a diagram including two graphs. The vertical axis relates to beta (compare FIG. 2), namely the angle of inclination of the local airflow direction in a projection on a x-z-plane.

The horizontal line shows "eta", namely the distance from outer wing end 15 divided by b, the length of main wing 2.

A first graph with crosses relates to the condition without winglets 8 and 9 and thus corresponds to FIGS. 3a and b, qualitatively. The second graph showing circles relates to an airflow distribution downstream of first winglet 8 and thus upstream of second winglet 9 (the first graph relating to the same x-position). The graphs result from a computer simulation of the airflow distribution (such as FIGS. 3a and b).

It can easily be seen that the first graph shows a maximum 16 closely to outer wing end 15 whereas the second graph has a maximum 17 there, an intermediate minimum at around eta=1.025 and a further maximum 18 at around eta=1.055, and decreases outwardly therefrom. Further, the second graph drops to a value of more than 50% of its smaller (left) maximum and more than 40% of its larger (right) maximum whereas it drops to a value of still more than 25% of its larger maximum at about eta=1.1, e.g. at a distance of about 10% of b from outer wing end 15. This angle distribution is a good basis for the already described function of winglet 9, compare FIG. 2.

Simulations on the basis of the airplane type Airbus A320 have been made. They will be explained hereunder. These simulations have been made by the computer programme CFD (computational fluid dynamics) of ANSYS.

As a general basic study, computer simulations for optimization of the thrust contribution of a two winglet set (first and second winglet) with a standard NACA 0012 main wing airfoil and a NACA 2412 winglet airfoil and without any inclination of the winglet relative to the main wing (thus with a setup along FIGS. 4 and 5) have shown that an aspect ratio 5 is a good choice. Although higher aspect ratios are more efficient in an aerodynamic sense, they have a smaller area and thus, produce smaller forces (and thus a small thrust). In other words, within the limitation of a length b2 (span) of 1.5 m (for the A320), a substantial winglet area is preferred. On the other hand, a too low aspect ratio increases the drag and decreases the efficiency in an amount that finally reduces the effective thrust by means of an increased drag. All in all, the CFD simulations repeatedly showed optimum values around 5.

On this basis, the length b1 of the upstream first winglet 8 for the A320 has been chosen to be ⅔, namely 1 m in order to enable the downstream second winglet 9 to take advantage of the main part of the broadened vortex region, compare again the setup of FIGS. 4 and 5 and the results in FIG. 6.

The mean chord length results from the length of the fingers and from the fixed aspect ratio. As usual for airplane wings, there is a diminution of the chord line length in an outward direction. For the first upstream winglet 8, the chord line length at the root is 400 mm and at the top is 300 mm, whereas for the downstream second winglet 9 the root chord length is 600 mm and the tip chord length 400 mm. These values have been chosen intuitively and arbitrarily.

For the winglets, instead of the above mentioned (readily available) NACA 2412 of the preliminary simulations, a transonic airfoil RAE 5214 has then been chosen which is a standard transonic airfoil and is well adapted to the aerodynamic conditions of the A320 at its typical travel velocity and altitude, compare below. The Airbus A320 is a well-documented and economically important model airplane for the present invention.

The most influential parameters are the angles of incidence gamma and the dihedral angle delta (namely the inclination with respect to a rotation around an axis parallel to the travel direction). In a first coarse mapping study, the mapping steps were 3° to 5° for gamma and 10° for delta. In this coarse mapping, a first and a second winglet but no third winglet have been included in the simulations in order to have a basis for a study of the third winglet.

Figure 7:
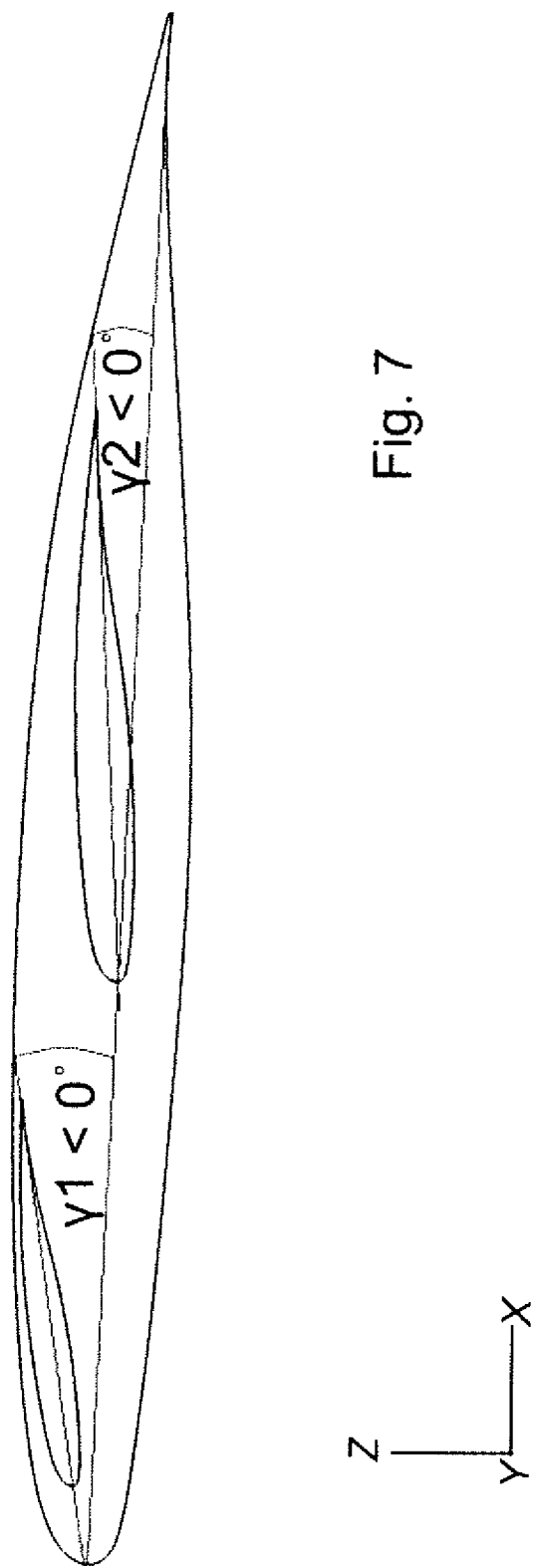
FIG. 7 is a schematic side view to explain the gamma angles of two winglets of an embodiment.

FIG. 7 illustrates the angle gamma, namely gamma 1 of winglet 8, the first winglet, and gamma 2 of winglet 9, the second winglet, both shown as airfoils (compare FIG. 2) and with their chord lines in relation to the main wing airfoil and its chord line. FIG. 8 illustrates the angle delta in a perspective as in FIG. 5, but less schematic. Again, delta 1 is related to the first winglet 8 and delta 2 to the second winglet 9. The structures in the left part of FIG. 8 are transient structures as used for the CFD simulations. These structures do not correspond to the actual A320 main wing to which the winglets, the slim structures in the middle and the right, have to be mounted but they define a pragmatic model to enable the simulation.

Figure 9:
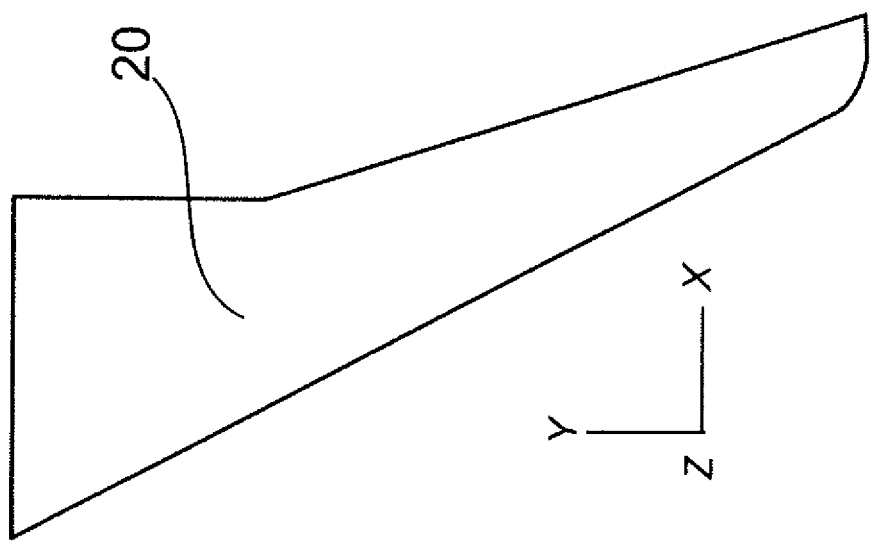
FIG. 9 is a plan view of an Airbus A320 main wing.

FIG. 9 shows a plan view onto a main wing of the A320, the wing tip is oriented downward and the base body is not shown but would be on top. FIG. 9 shows a main wing 20 of the A320 which actually has a so called fence structure, namely a vertical plate, at the end of the wing which has been omitted here, because it is to be substituted by the winglets according to the invention.

Figure 10:
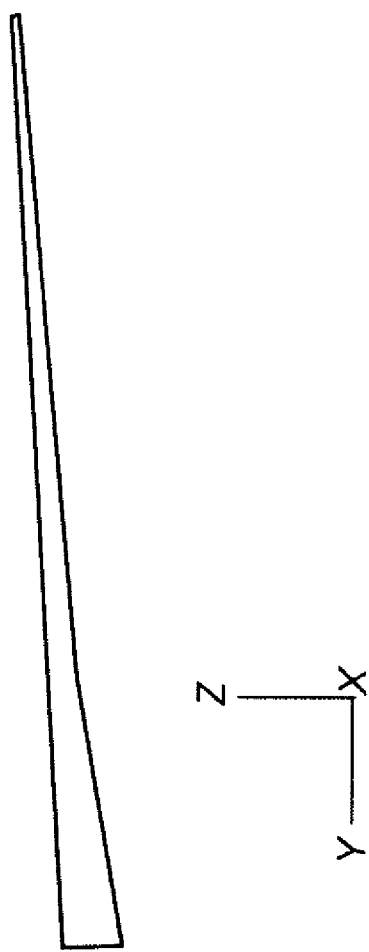
FIG. 10 is a front view of said wing.
Figure 11:
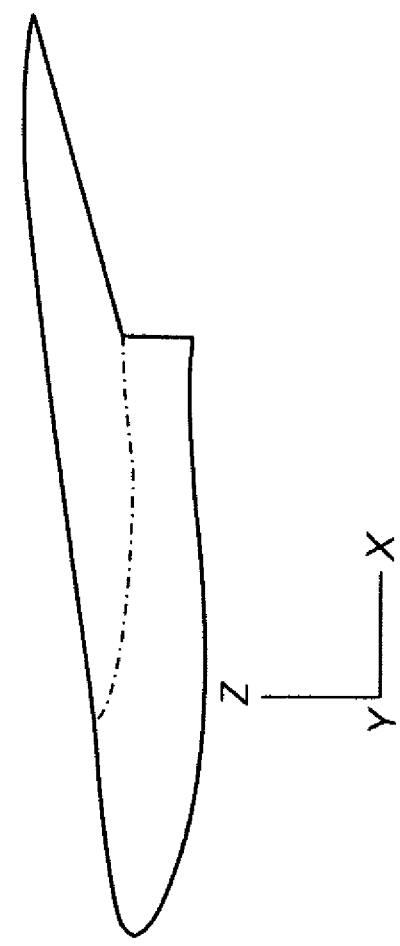
FIG. 11 is a side view of said wing.

FIG. 10 shows the main wing 20 of FIG. 9 in a front view, in FIG. 11 shows the main wing 20 in a side view (perspective perpendicular to the travel direction –X). The somewhat inclined V geometry of the main wings of the A320 can be seen in FIGS. 10 and 11.

A typical travel velocity of 0.78 mach and a typical travel altitude of 35,000 feet has been chosen which means an air density of 0.380 kg/m$^3$ (comparison: 1.125 kg/m$^3$ on ground), a static pressure of 23.842 Pa, a static temperature of 218.8 K and a true air speed (TAS) of 450 kts which is 231.5 m/s. The velocity chosen here is reason to a compressible simulation model in contrast to the more simple incompressible simulation models appropriate for lower velocities and thus in particular for smaller passenger airplanes. This means that pressure and temperature are variables in the airflow and that local areas with air velocities above 1 Mach appear which is called a transsonic flow. The total weight of the aircraft is about 70 tons. A typical angle of attack alpha is 1.7° for the main wing end in inflight shape. This value is illustrated in FIG. 2 and relates to the angle between the chord line of the main wing at its tip end to the actual flight direction. It has been determined by variation of this angle and calculation of the resultant overall lifting force of the two main wings. When they equal the required 70 to, the mentioned value is approximately correct.

In this mapping, a certain parameter set, subsequently named V0040, has been chosen as an optimum and has been the basis for the following more detailed comparisons.

The gamma and delta values of winglets 8 and 9 ("finger 1 and finger 2") are listed in table I which shows that first winglet 8 has a gamma of –10° and a delta of –20° (the negative priority meaning an anti-clockwise rotation with regard to FIGS. 7 and 8) whereas second winglet 9 has a gamma of –5° and a delta of –10°. Starting therefrom, in the third and fourth line of table I, gamma of the first winglet 8 has been decreased and increased by 2°, respectively, and in the fifth and sixth lines, delta of first winglet 8 has been decreased and increased by 10°, respectively. The following four lines repeat the same schedule for second winglet 9. For comparison, the first line relates to a main wing without winglet (and without fence). In the column left from the already mentioned values of gamma and delta, the numbers of the simulations are listed. V0040 is the second one.

From the sixth column on, that is right from the gamma and delta values, the simulation results are shown, namely the X-directed force on an outward section of the main wing (drag) in N (Newton as all other forces). In the seventh column, the Z-directed force (lift) on this outward section is shown. The outward section is defined starting from a borderline approximately 4.3 m inward of the main wing tip. It is used in these simulations because this outward section shows clear influence of the winglets whereas the inward section and the base body do not.

The following four columns show the drag and the lift for both winglets ("finger 1 and 2" being the first and second winglet). Please note that the data for "finger 1" in the first line relates to a so-called wing tip (in German: Randbogen) which is a structure between an outward interface of the main wing and the already mentioned fence structure. This wing tip is more or less a somewhat rounded outer wing end and has been treated as a "first winglet" here to make a fair comparison. It is substituted by the winglets according to the invention which are mounted to the same interface.

The following column shows the complete lift/drag ratio of the wing including the outward and the inward section as well as the winglets (with the exception of the first line).

The next column is the reduction achieved by the two winglets in the various configurations with regard to the drag ("delta X-force") and the respective relative value is in the next-to-last column.

Finally, the relative lift/drag ratio improvement is shown. Please note that table I comprises rounded values whereas the calculations have been done by the exact values which explains some small inconsistencies when checking the numbers in table I.

It can easily be seen that V0040 must be near a local optimum since the drag reduction and the lift drag ratio improvement of 2.72% and 6.31%, respectively, are with the best results in the complete table. The small decrease of gamma of the first winglet 8 (from –10 to –8) leads to the results in the fourth line (V0090) which are even a little bit better. The same applies to a decrease of delta of the second winglet 9 from −10° to 0°, compare V0093 in the next-to-last line. Further, a reduction of delta of the first winglet 8 from −20° to −30° leaves the results almost unchanged, compare V0091. However, all other results are more or less remarkably worse.

FIG. 12 shows a side view in the perspective of FIG. 11 but with the two winglets added to the main wing in FIG. 11 and, additionally, with two hatched lines for later reference (reference lines for air velocity angle) and FIG. 13 shows a plan view onto the main wing tip and the two winglets with the same reference lines as in FIG. 12. Both reference lines are upstream of the respective leading edge of the winglet by 10 cm and are parallel to said leading edge.

Figure 14:
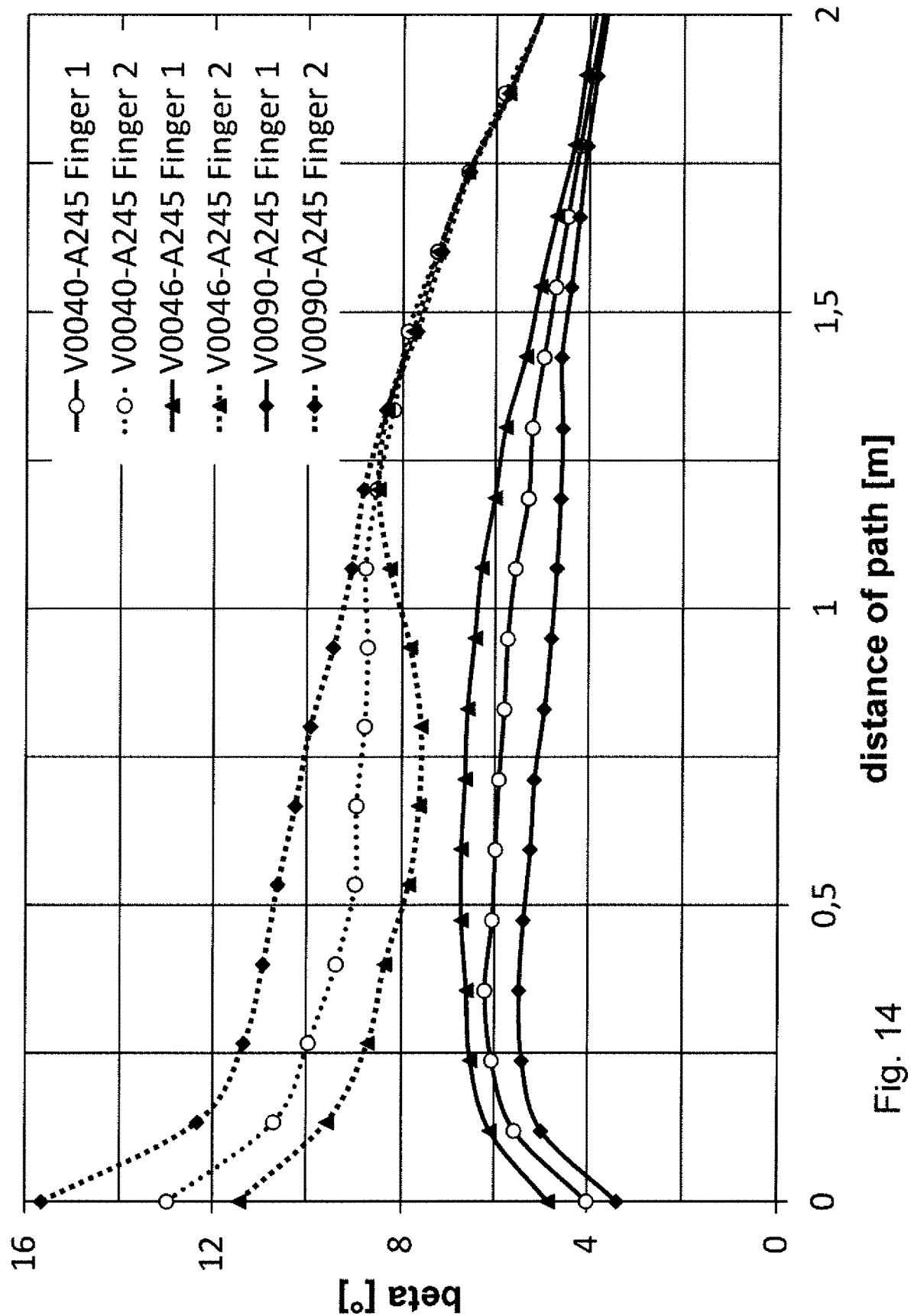
FIGS. 14 to 17 are diagrams illustrating beta angles at varying distances from the main wing tip for various simulations in the embodiment.

FIG. 14 is a diagram comparable to FIG. 6, namely showing the angle beta on the vertical axis and the distance from the main wing tip along the reference lines just explained. The basic parameter set and simulation V0040 is represented by circles, V0046 is represented by triangles, and V0090 is represented by diamonds. The solid lines relate to the reference line upstream of the first winglet 8 and the dotted lines to the other one, upstream of the second winglet 9 and downstream of the first winglet 8. Table I clarifies that V0046 has a reduced gamma of the first winglet 8 and V0090 an increased gamma of the first winglet 8 with a step size 2°.

First of all, the graphs show that the first winglet 8 produces a significantly "broadened" vortex region, even upstream of the first winglet 8 as shown by the solid lines. In contrast to FIG. 6, there is no pronounced second maximum (18 in FIG. 6) but a more or less constant beta angle between 0.5 m and about 1.2 m. The respective length of the main wing is 16.35 m which means for example an eta of 1.031 for 1.5 m and of 1.07 for 1.2 m, approximately (compare FIG. 6).

This beta value is in the region of 9° which is in the region of 70% of the maximum at 0° (both for the reference line between both winglets, i.e. the dotted graph). Further, with the reduced gamma value, V0046 (triangles) shows an increased beta upstream of the first winglet 8 and a decreased beta downstream thereof. Contrary to that, with increased gamma, V0090 shows an increased beta downstream of the first winglet 8 and a decreased beta upstream thereof. Thus, the inclination gamma (angle of incidence) can enhance the upwards tendency of the airflow in between the winglets, in particular for places closer to the main wing tip than 1 m, compare FIG. 14. In this case, the beta values above a distance of 1 m are not deteriorated thereby. The results in table I show, that the overall performance of this parameter set is even a little bit better than V0040. This is obviously due to a reduced overall drag (although the angle of incidence has been increased), i.e. by a stronger contribution to the overall thrust.

On the other hand, a reduction of the gamma value from 10° to 8° and thus from V0040 to V0046 clearly leads to substantially deteriorated results, compare table I. Consequently, in a further step of optimization, gamma values higher, but not smaller than 10° and possibly even a little bit smaller than 12° could be analyzed.

Figure 15:
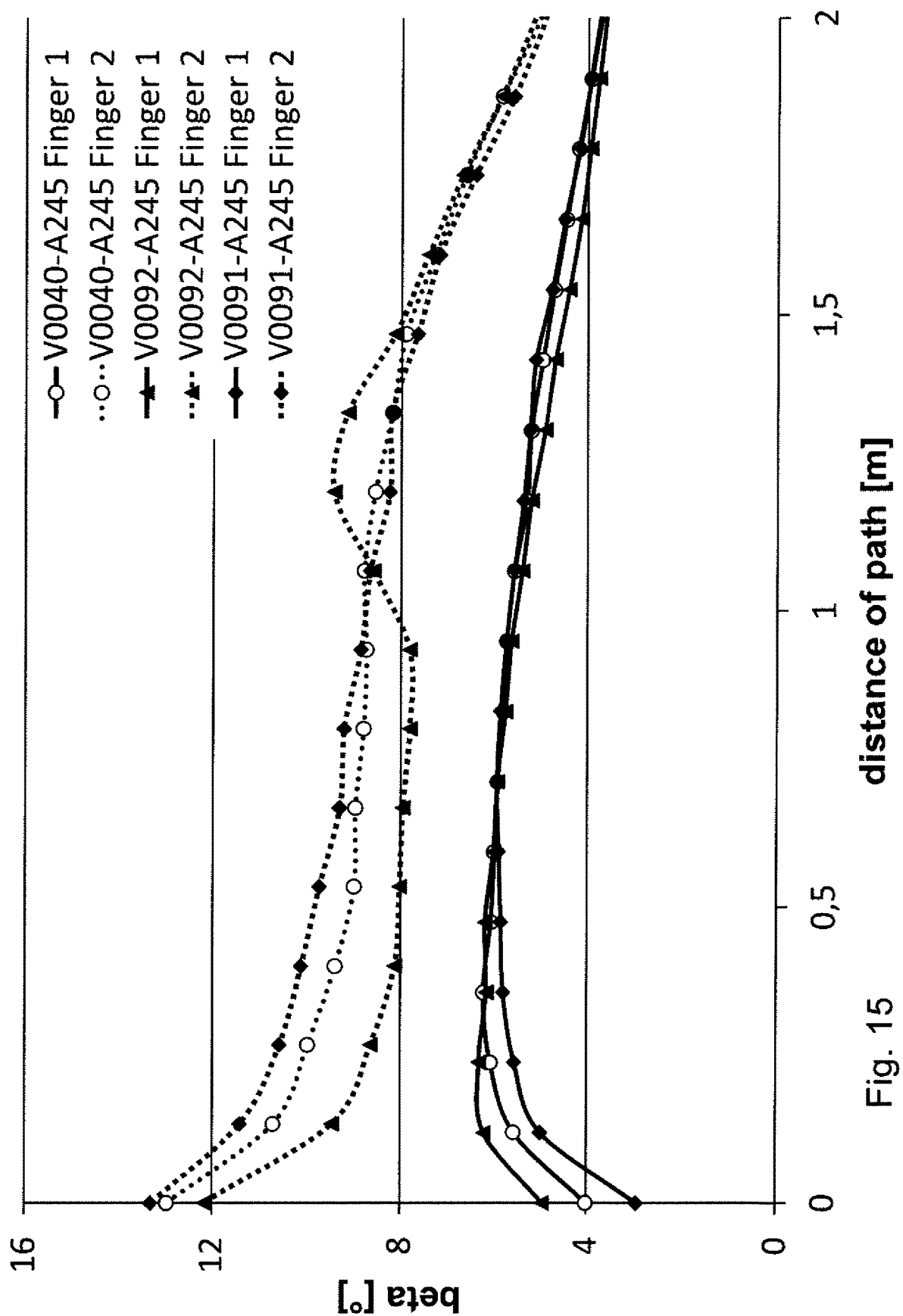

Further, FIG. 15 shows an analogous diagram, but for V0040 in comparison to V0092 and V0091. Here, the angle delta of the first winglet 8 has been varied from −20° to −10° and to −30°, compare table I and FIG. 8. Obviously, this has little impact on the air velocity angle (beta) distribution upstream of the first winglet 8 (solid lines) but it has an impact on the airstream angles downstream thereof (dotted lines). Again, the beta values increase a little bit for distances below 1 m by increasing the delta value, namely for V0091. The respective performance results in table I are almost identical with those of V0040 and obviously the beta values in FIG. 15 as well.

On the other hand, decreasing the delta value to −10 and thus bringing both winglets in line (as seen in the flight direction) qualitatively changes the dotted graph in FIG. 15. The beta values are reduced up to about 1 m, namely the length of the first winglet 8, and are clearly increased above that distance value. Seemingly, the second winglet 9 is somewhat in the lee of the first winglet 8 (experiences the downwash thereof) up to 1 m and "sees" the winglet tip vortex thereof at distances above 1 m. In summary, this does not improve the results but leads to some deterioration, as table I shows. The inventors assume that the beta increase at distances above 1 m does not compensate for the beta decrease at smaller distances.

Figure 16:
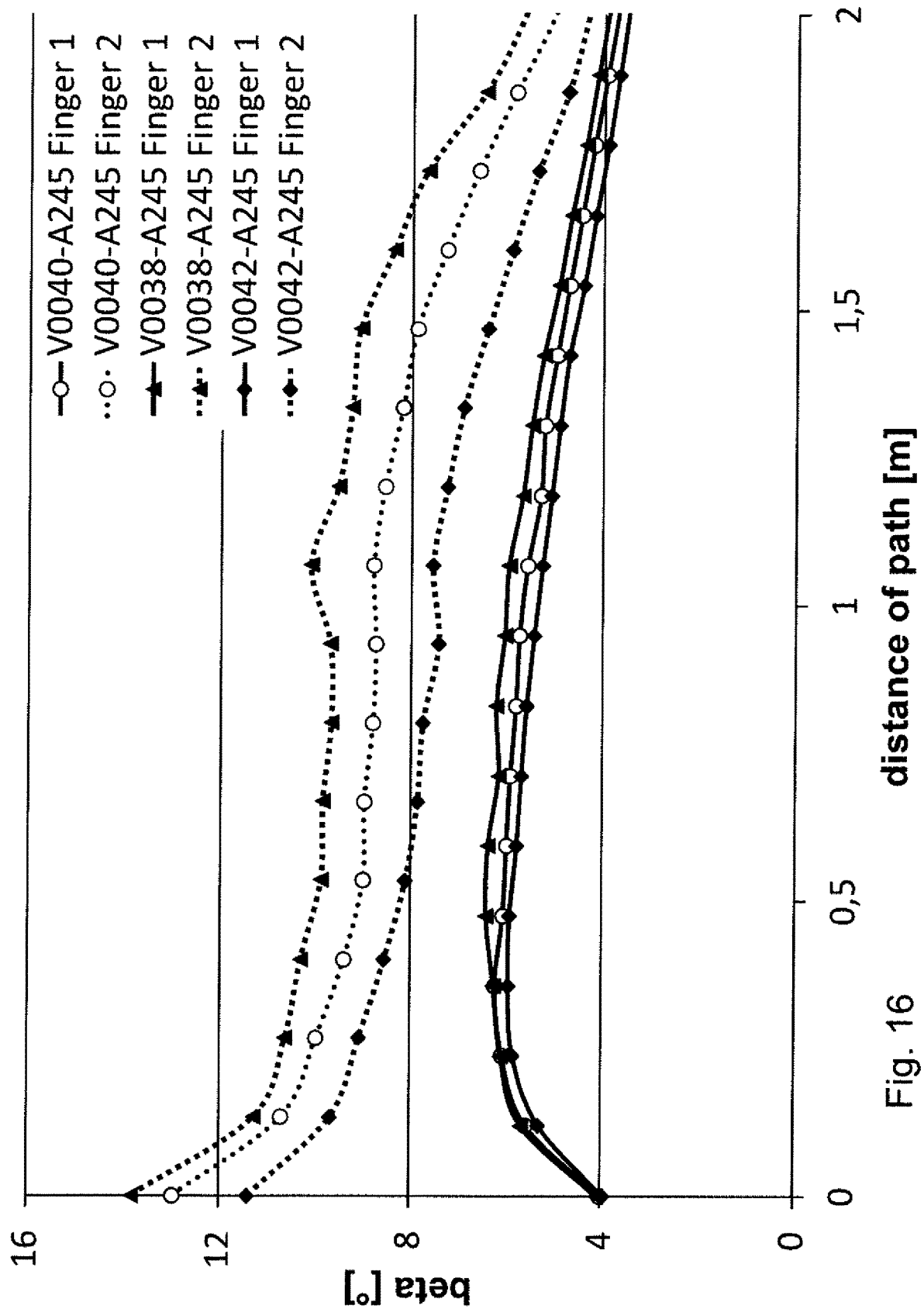

FIG. 16 shows another analogous diagram, now relating to a variation of the gamma angle of the second winglet 9. Again, this obviously has not much impact on the beta values upstream of the first winglet 8 (solid lines), but has a substantial impact on the beta values in between both winglets (dotted lines). Here, the beta values increase with a small decrease of gamma from 5° to 3° and, in the opposite, they decrease with an increase of gamma from 5° to 7°. In a similar manner as the solid lines in FIG. 14, a turning into the airstream of the winglet obviously decreases the inclination of the airstream upstream of the winglet. The results in table I clearly show that both variations, V0038 and V0042 decrease the performance results. In particular, the reduction of beta between both winglets by an increase of gamma of the second winglet 9 substantially deteriorates the lift/drag improvement. Further, a too strong inclination of the winglet does produce more lift but also produces over-proportionally more drag and thus leads to a deterioration.

Obviously, with a next step of optimization, the gamma value of the downstream winglets should be left at 5°.

Figure 17:
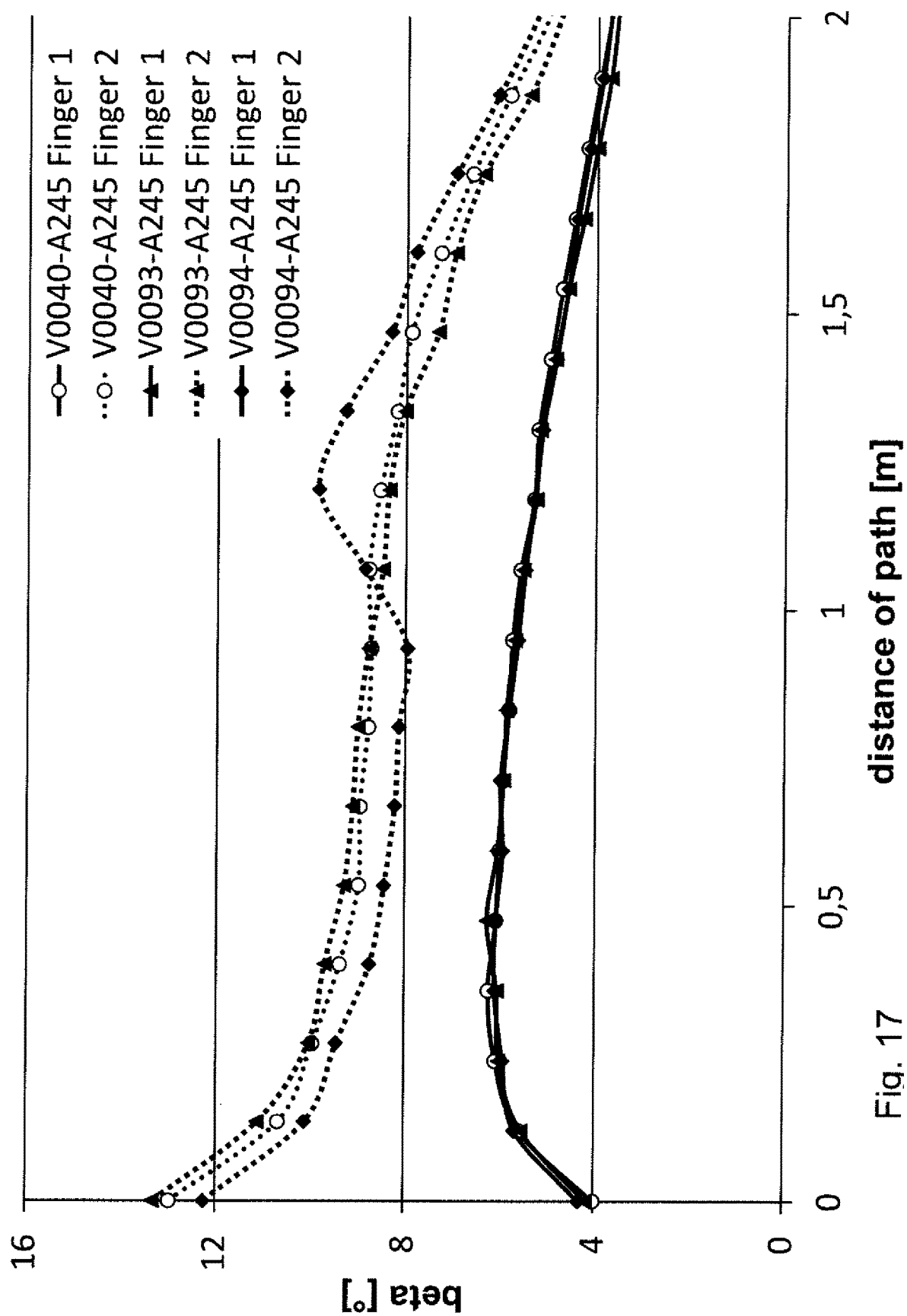

Finally, FIG. 17 relates to a variation of the delta angle of the second winglet 9 and leads to similar results as FIG. 15: for V0094, the delta values of both winglets are −20° and again the second 9 winglet seems to be in the lee of the upstream winglet and shows a strong impact by the winglet tip vortex thereof which leads to comparatively bad results, in particular with regard to the lift drag ratio. Increasing the delta difference between both winglets by V0093 does not change much in the beta values and leads to similar (somewhat improved) results in table I. Again, with a next step of optimization, the range of delta for the second winglet 9 between 0° and −10° is interesting.

On the basis of the above results, further investigations with three winglets and again based on what has been explained above in relation to the A320 have been conducted. Since the number of simulations feasible in total is limited, the inventors concentrated on what has been found for two winglets. Consequently, based on the comparable results with regard to the drag reduction of more than 2.7% and the lift/drag ratio for the complete wing (compare the fourth-last and second-last column in table I), the parameters underlying V0040, V0090, V0091, and V0093 were considered in particular. Consequently, simulations with varying values for the angle of incidence gamma and the dihedral angle delta of the third winglet were performed on the basis of these four parameter sets and were evaluated in a similar manner as explained above for the first and second winglet.

Simultaneously, data with regard to the in-flight shape of the main wing of the A320 were available with the main impact that the chord line at the wing end of the main wing is rotated from the so-called jig shape underlying the calculations explained above by about 1.5°. This can be seen by the slightly amended gamma values explained below. Still further, data relating to the drag of the complete airplane for different inclinations thereof were available, then, so that the impact of an improvement of the overall lift (by a lift contribution of the winglets as well as by an increase of the lift of the main wing due to a limitation of the vortex-induced losses) on the overall drag due to a variation of the inclination of the airplane could be assessed.

The results (not shown here in detail) showed that the V0091 basis proved favourable. The respective embodiment will be explained hereunder.

Figure 18:
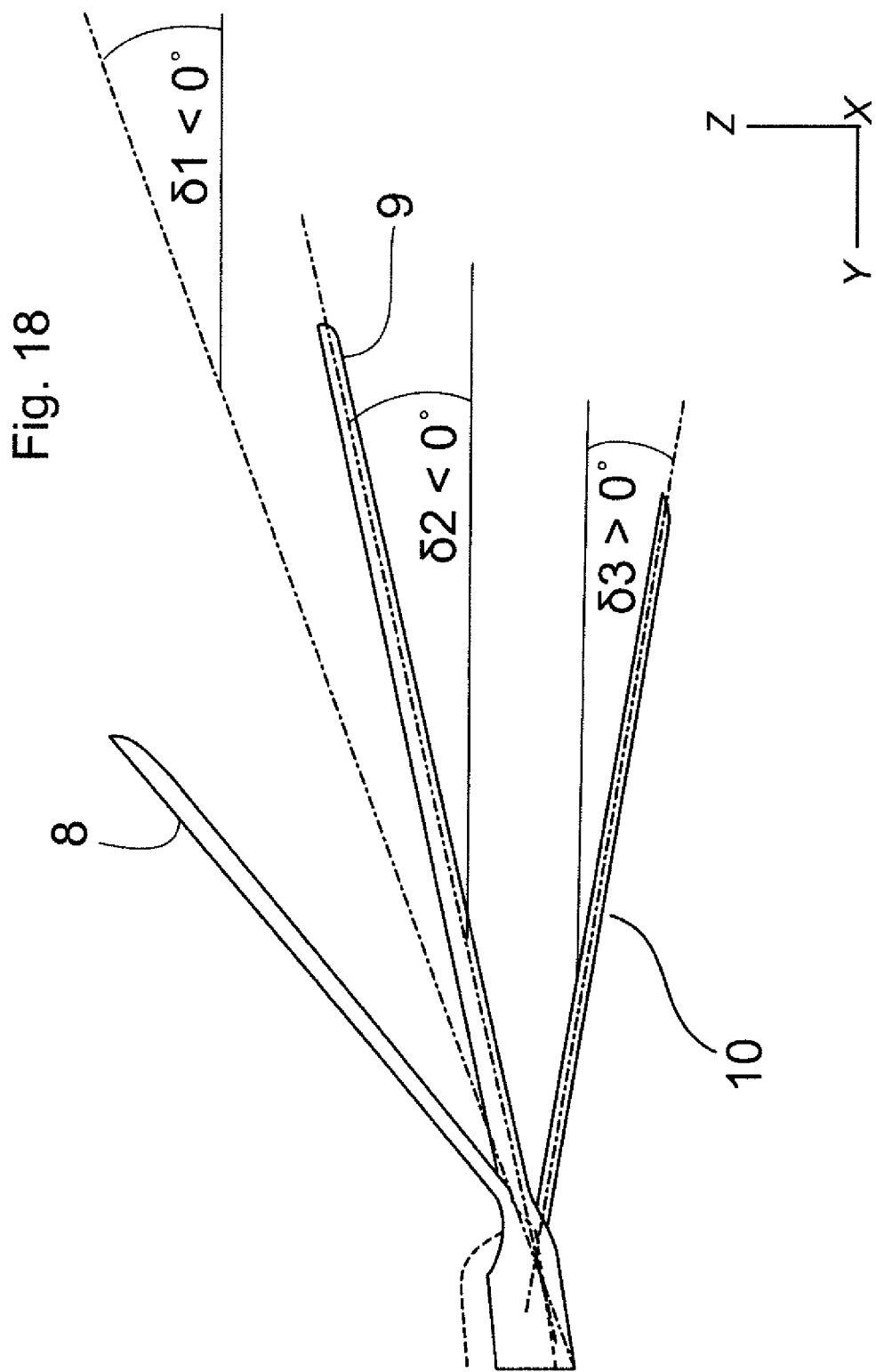
FIG. 18 is a front view of three winglets according to an embodiment of the invention showing their dihedral angles.

FIG. 18 shows a front view of the winglets 8, 9, 10 of this embodiment as seen in the x-direction and illustrates the dihedral angles delta 1, 2, 3 of the three winglets. The upper most winglet is the first one, the middle winglet is the second one, and the lowest winglet is the third downstream one. FIG. 18 shows qualitatively, that a substantial, but limited relative dihedral angle between the succeeding winglets has proven to be advantageous also for the three winglet embodiment.

Figure 19:
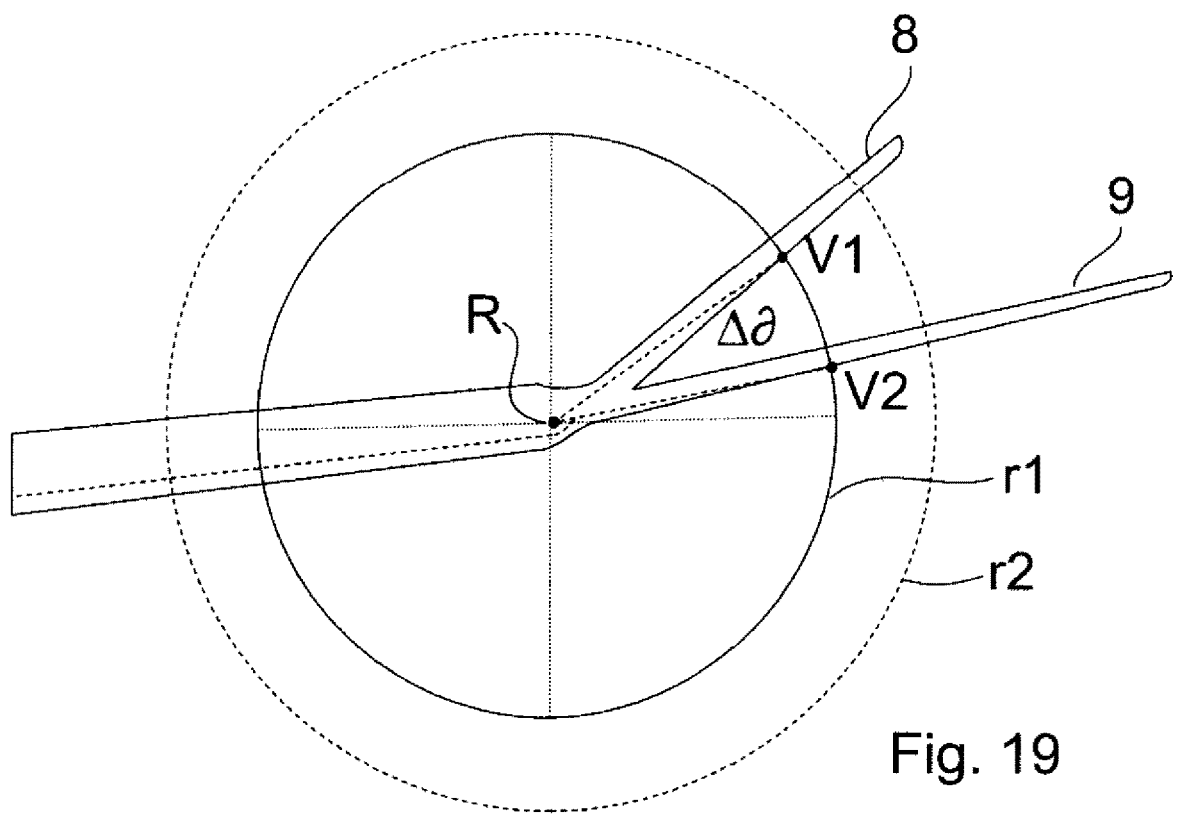
FIG. 19 is another front view of two winglets for explaining a relative dihedral angle.

Taking this opportunity, FIG. 19 explains the definition of the relative dihedral angle along the claim language. In the same perspective as FIG. 18, the first and the second winglet are shown together with two radii r1 and r2 of different size. The meeting point of a vertical and the horizontal line is the root R (at the splitting point horizontally and the meeting of the leading edges vertically) and one vortex of an isosceles triangle shown, the other two vertices of which are on the leading edges of the two winglets and referred as V1 and V2. The angle between the line R-V1 and the line R-V2 is the relative dihedral angle if taken as an average over all radii ri possible within the shorter one of the two winglets, namely the first one.

The visible difference between the line R-V1 from the leading edge of the first winglet is connected to the bending of the first winglet to be explained hereunder which is also the background of the deviation between the line for delta 1 and the first winglet in FIG. 18.

Figure 20:
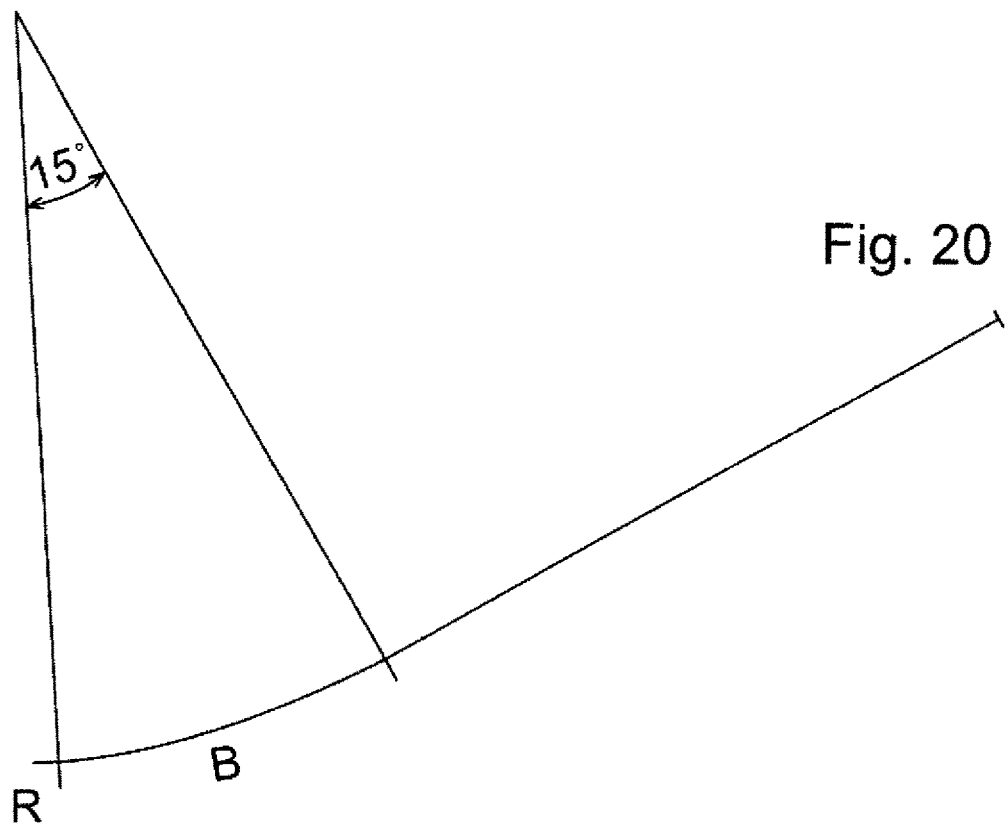
FIG. 20 is a schematic drawing for explaining a bending of a first winglet.

FIG. 20 illustrates the above mentioned bending of the first winglet which is so to say a distribution of a part of the dihedral angle along a certain portion of the spanwise length. Actually, in FIG. 20, a leading edge L is schematically shown to start from a root R and to be bent along a circular arch shape B extending over one third (330 mm) of its length with a radius of 750 mm and an arch angle of −15°. Already at the start of R the leading edge of the first winglet has a dihedral angle of −20°. This means that outwards of the bending, the dihedral angle for the second and third of the length of the first winglet is actually −35°. In an average along the complete spanwise length of the first winglet from R to its outward end, an average dihedral angle of about −30° results, −15° of which have been "distributed" along the arch as described.

The reason is that in this particular embodiment, a straight leading edge of the first winglet with a dihedral angle of −30° has made it somewhat difficult to provide for a smooth transition of a leading edge to that one of the main wing end (in the so-called fairing region) whereas with −20° dihedral angle, the smooth transition has not caused any problems. Therefore, in order to enable an average value of −30°, the solution of FIG. 20 has been chosen.

In general, it is within the teaching of this invention to use winglet shapes that are not straight along the spanwise direction such as shown in FIG. 20. They could even be arch shaped along the complete length as pointed out before. What is most relevant in the view of the inventors, is the relative dihedral angle in an average sense. If for example, a first and a second winglet would both be arch shaped in a similar manner so that the isosceles triangle construction explained earlier with a fixed vortex at the root would be inclined more and more with increasing length of the equal sides thereof due to the curvature of the winglet leading edges, the relative dihedral angle according to this construction might even remain almost constant along the leading edges. Still, at a certain portion along the spanwise length of for example the second winglet, the proximate portion along the spanwise length of the first winglet would be positioned relative to the second winglet in a manner that is well described by the relative dihedral angle (remember the somewhat rotationally symmetrical shape of the vortex at the wing end) and is well described by the triangle construction.

The absolute dihedral angles of the second and the third winglet in this embodiment are delta 2=−10° and delta 3=+10° wherein these two winglets of this embodiment do not have an arch shape as explained along FIG. 20. Consequently, the relative dihedral angle between the first and the second winglet is 20°, is the same as the relative dihedral angle between the second and the third winglet, and the first winglet is more upwardly inclined than the second winglet, the second winglet being more upwardly inclined than the third winglet, compare FIG. 18. The angle delta 1 shown in FIG. 18 is the starting dihedral angle at the root of the first winglet, namely −20° instead of the average value of −30°.

Figure 21:
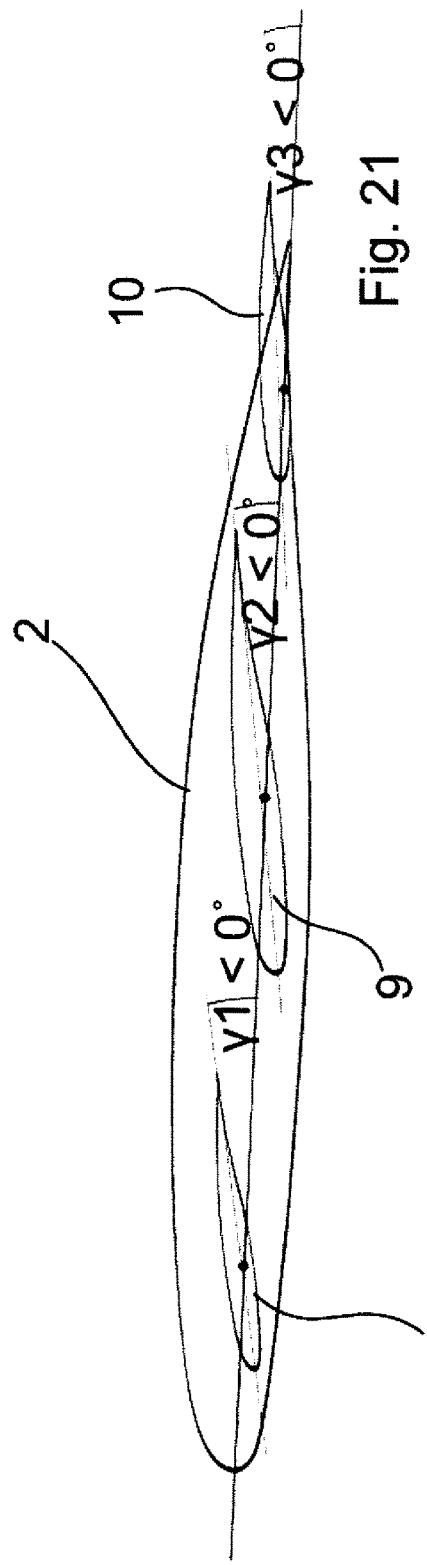
FIG. 21 is a side view of sections of a main wing and three winglets for explaining angles of inclination.

As regards the angles of incidence, reference is made to FIG. 21 showing a side view and sections through the three winglets 8, 9, 10, and the main wing 2. The sectional planes are different, naturally, namely 10% outward of the spanwise length of the winglets from the respective splitting positions, and 10% inward in case of the main wing 2, as explained earlier, to provide for undisturbed chord lines. The chord lines and the respective angles gamma 1, 2, 3 are shown in FIG. 21. The angles are gamma 1=−9° for the first winglet, gamma 2=−4° for the second winglet and gamma 3=−1° for the third winglet, all being defined relative to the main wing chord line at the described outward position and in the inflight shape of the winglets and of the main wing (all parameters explained for this embodiment relating to the in-flight shape).

FIG. 21 also shows the respective rotating points on the chord line of main wing 2 as well as on the chord line of the respective winglet 8, 9, 10. In terms of the respective chord line length of the winglets, the rotating points are approximately at a third thereof. In terms of the chord line length of main wing 2, the rotating point of the first winglet is at 16.7% (0% being the front most point on the chord line), the rotating point of the second winglet is at 54.8%, and the rotating point of the third winglet is at 88.1%.

Figure 22:
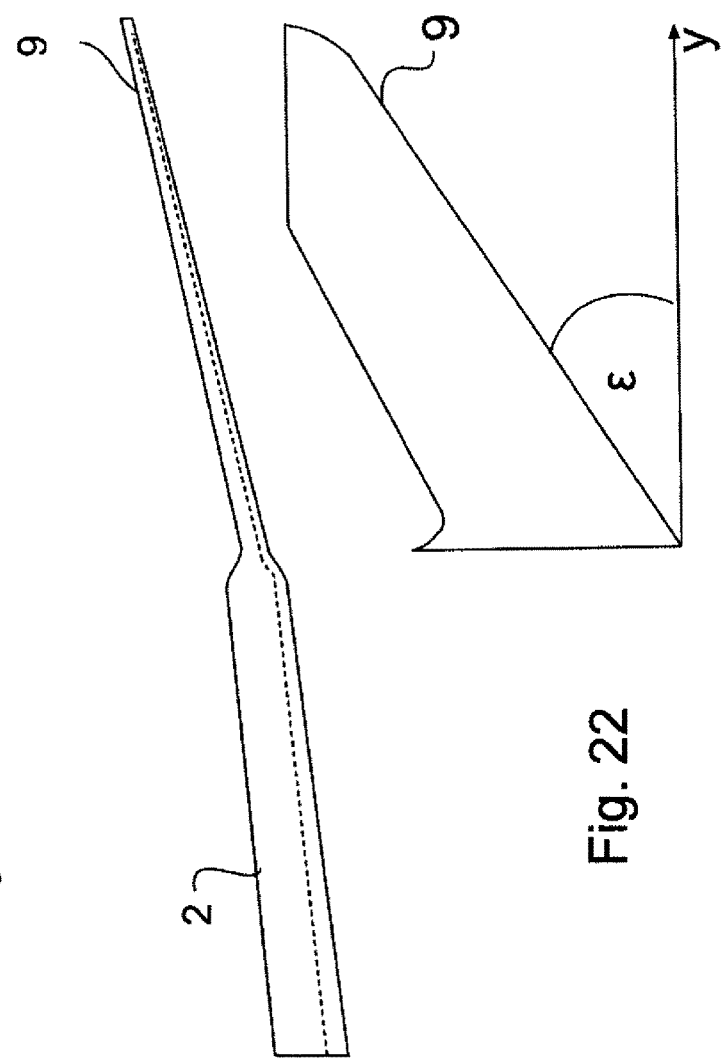
FIG. 22 combines a front view and a top view for explaining a sweepback angle of a winglet.

FIG. 22 illustrates the sweepback angle epsilon of a representative winglet 9, namely the angle between the leading edge thereof and a direction (y in FIG. 22) being horizontal and perpendicular to the flight direction. Herein, winglet 9 is thought to be horizontal (delta and gamma being zero in a fictious manner). Alternatively, the spanwise length of winglet 9 could be used instead of its actual extension in the y-direction when being projected onto a horizontal plane. Please note that also the arch shape of winglet 8 as explained along FIG. 22 would be regarded to be unrolled. In other words, the spanwise length includes the length of the arch.

In the present embodiment, the sweepback angle of the main wing 2 is 27.5°. Variations starting from this value showed that an increased sweepback angle of 32° is preferable for the winglets, in other words 4.5° sweepback angle relative to the main wing's sweepback angle. This applies for the second and for the third winglets 9, 10 in this embodiment whereas for the first winglet 8, the sweepback angle has been increased slightly to 34° in order to preserve a certain distance in the x-direction to the leading edge of the second winglet 9, compare the top view in FIG. 25 explained below.

Figure 23:
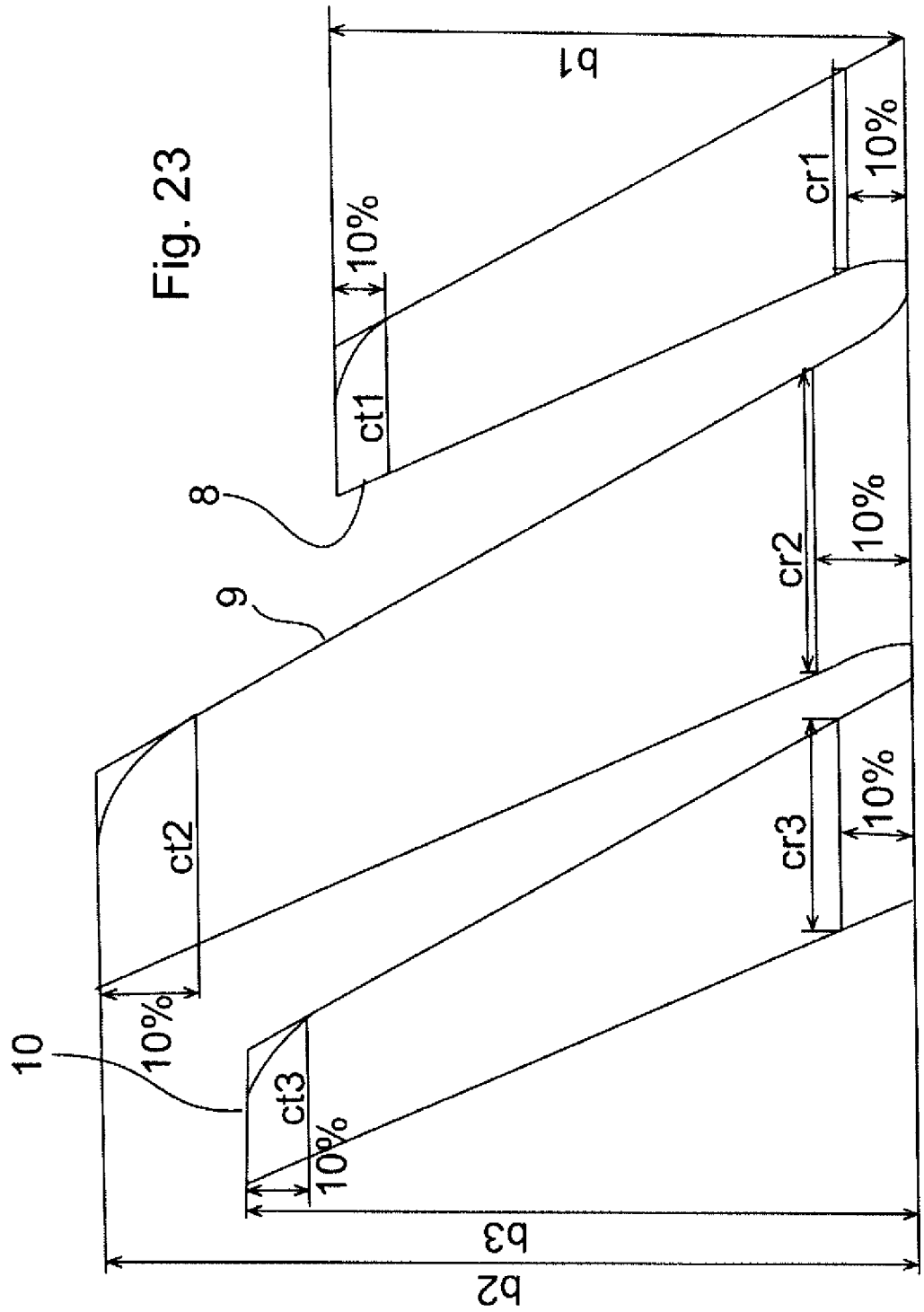
FIG. 23 is a top view onto three winglets in a plane for explaining the shape.

FIG. 23 is a fictious top view onto the three winglets 8, 9, 10, to explain their shape. It is fictious because the dihedral angles and the angles of incidence are zero in FIG. 23 and the arch shape of the first winglet 8 is unrolled. FIG. 23, thus, shows the respective spanwise length b1, 2, 3. It further shows the chord line lengths cr1, 2, 3, at 10% of the spanwise length outward of the splitting points (these being at the bottom of FIG. 23) as well as the tip chord line lengths ct1, 2, 3, at 10% inward of the winglets' tips.

The actual values are (in the order first, second, third winglet): a root chord length cr of 0.4 m, 0.6 m, 0.4 m; a tip chord length ct of 0.3 m, 0.4 m, 0.25 m; a spanwise length b of 1 m, 1.5 m, 1.2 m. This corresponds to a root chord length cr of approximately 25% of the main wing chord length at its end (as defined), approximately 37% and approximately 25%; a tip chord length relative to the root chord length of 75%, 67% and 63%; and a spanwise length relative to the spanwise main wing length (16.4 m) of 6.1%, 9.2%, 7.3%, respectively.

Please note that the angle of sweepback as shown in FIG. 23 is no rotating operation result. This can be seen in that the chord line lengths cr and ct remain unchanged and remain in the x-z-plane, in other words horizontal in FIG. 23. This is necessary in order not to disturb the airfoil by the introduction of the sweepback angle.

Still further, FIG. 23 shows a rounding of the respective outer forward corner of the winglets' shape. This rounding relates to the region between 90% and 100% of the spanwise length wherein the chord line length is continuously reduced from 90% to 100% spanwise length by 50% of the chord line length such that in the top view of FIG. 23 an arch shape is generated. It is common practice to use roundings at the outer forward corners of wings to avoid turbulences at sharp corner shapes. By the just explained reduction of the chord line length in the outer 10% of the spanwise length, the qualitative nature of the airfoil can be preserved.

The airfoil used here is adapted to the transonic conditions at the main wing of the A320 at its typical travel velocity and travel altitude and is named RAE 5214. As just explained this airfoil is still valid in the outer 10% of the spanwise length of the winglets.

Still further, this trailing edge (opposite to the leading edge) of the winglets is blunt for manufacturing and stability reasons by cutting it at 98% of the respective chord line length for all winglets.

The transformation of the shapes shown in FIG. 23 to the actual 3D geometry is as follows: first, the sweepback angles are introduced which are already shown in FIG. 23. Second, the bending of the first winglet along the inner third of its spanwise length with the radius of 750 mm and the angle of 15° is introduced. Then, the winglets are inclined by a rotation by the angle of incidence gamma. Then, the dihedral angles are adjusted, namely by inclining the first winglet by 20° upwardly (further 15° being in the bending), the second winglet by 10° upwardly and the third winglet by 10° downwardly.

Please note that the above transformation procedure does not relate to the jig shape and to the geometry as manufactured which is slightly different and depends on the elastic properties of the main wing and the winglets. These elastic properties are subject of the mechanical structure of the wing and the winglets. It is common practice for the mechanical engineer to predict mechanical deformations under aerodynamic loads by for example finite elements calculations. One example for a practical computer program is NASTRAN.

Thus, depending on the actual implementation, the jig shape can vary although the in-flight shape might not change. It is, naturally, the in-flight shape that is responsible for the aerodynamic performance and the economic advantages.

Table II shows some quantitative results of the three winglet embodiment just explained (P0001). It is compared to the A320 without the invention, but, in contrast to table I, including the so-called fence. This fence is a winglet-like structure and omitting the fence, as in table I, relates to the improvements by the addition of a (two) winglet construction according to the invention to a winglet-free airplane whereas table II shows the improvements of the invention, namely its three winglet embodiment, in relation to the actual A320 as used in practice including the fence. This is named B0001.

The lift to drag ratios for both cases are shown (L/D) in the second and third column and the relative improvement of the invention is shown as a percentage value in the forth column. This is the case for six different overall masses of the airplane between 55 t and 80 t whereas table I relates to 70 t, only. The differences between the masses are mainly due to the tank contents and thus the travel distance.

Table II clearly shows that the lift to drag improvement by the invention relative to the actual A320 is between almost 2% in a light case and almost 5% in a heavy case. This shows that the invention is the more effective the more pronounced the vortex produced by the main wing is (in the heavy case, the required lift is much larger, naturally). In comparison to table I, the lift to drag ratio improvements are smaller (around 6.3% for the best cases in table I). This is due to the positive effect of the conventional fence included in table II and to the in-flight deformation of the main wing, namely a certain twist of the main wing which reduces the vortex to a certain extent. For a typical case of 70 t, the drag reduction of an A320 including the three winglet embodiment of the invention compared to the conventional A320 including fence is about 4% (wing only) and 3% (complete airplane), presently. This improvement is mainly due to a thrust contribution of mainly the second winglet and also due to a limited lift contribution of the winglets and an improved lift of the main wing by means of a reduction of the vortex. The lift contributions allow a smaller inclination of the complete airplane in travel flight condition and can thus be "transformed" into a drag reduction (of estimated 1%). The result is about 3% as just stated.

Figure 24:
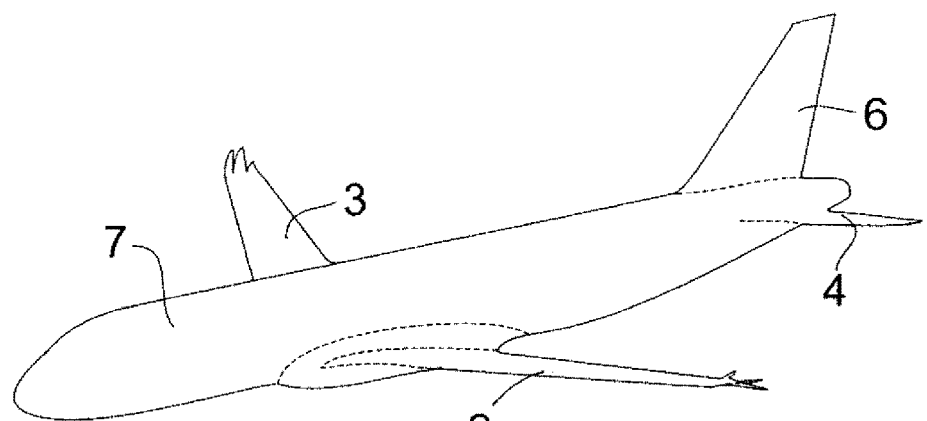
FIG. 24 is a perspective drawing of a complete airplane according to the invention.
Figure 25:
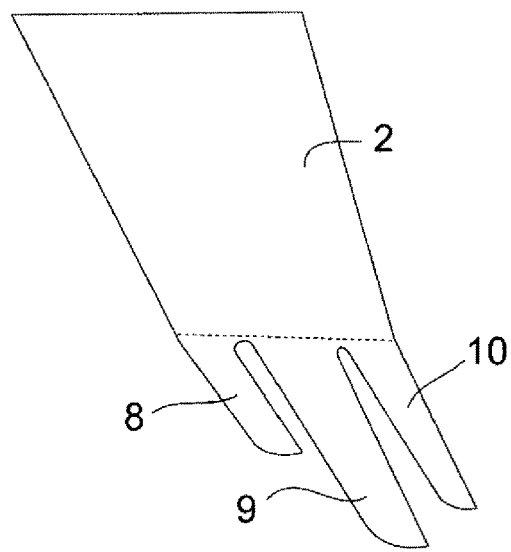
FIG. 25 is a top view onto three winglets at a main wing tip of said airplane.
Figure 26:
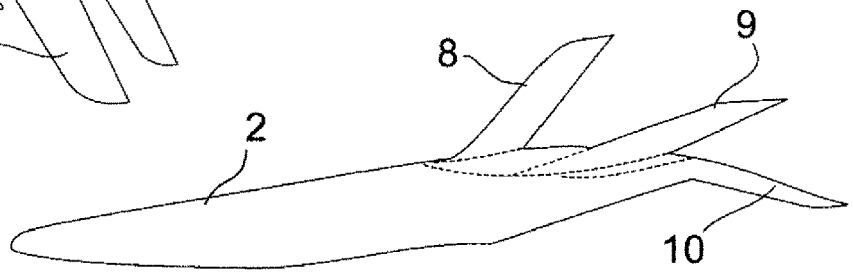
FIG. 26 is a side view of the three winglets of FIG. 25.
Figure 27:
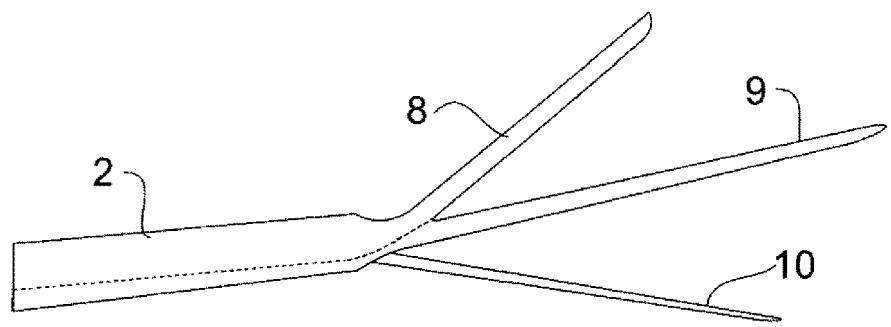
FIG. 27 is a front view thereof.

For illustration, FIGS. 24 to 27 show the 3D shape of the A320 and three winglets, namely a perspective view in FIG. 24 of the complete airplane, a top view onto the main wing end and the winglets in FIG. 25 (against the z-direction), a side view (in y-direction) in FIG. 26, and finally a front view (in x-direction) in FIG. 27.

The figures show smooth transitions in the fairing region between the main wing end and the winglets and also some thickening at the inward portion of the trailing edges of the first and second winglets. These structures are intuitive and meant to avoid turbulences.

Figure 28:
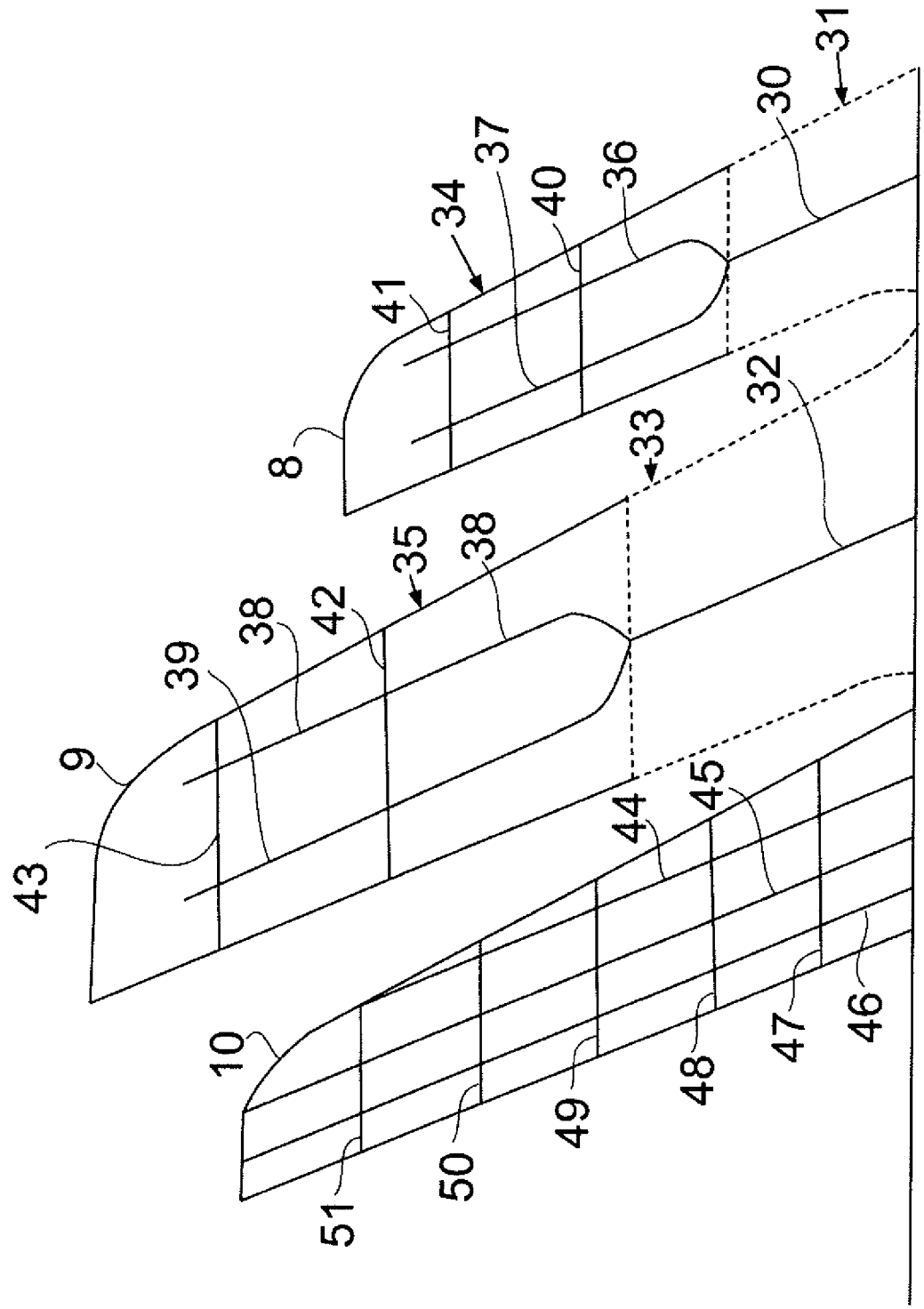
FIG. 28 is a schematic plan view onto three winglets, symbolically in a common plane, for explaining an inner mechanical structure thereof.

Hereunder, the morphing and stall concept for high load conditions explained earlier will be exemplified on the basis of the just described three winglet implementation. FIG. 28 is a schematic and simplified plan view onto three winglets 8, 9, 10 which are shown for simplicity in a common plane. FIG. 28 shows the relative sizes and in particular lengths of the three winglets as already discussed in detail. Further, FIG. 28 indicates an inner mechanical structure of the winglets in terms of spars and ribs.

In particular, upstream winglet 8 has a single spar 30 in a proximal portion 31 thereof and middle winglet 9 has, in an analogous manner, a single spar 32 in a proximal winglet portion 33. The inner winglet portions 31 and 33 are shown in hatched lines in contrast to the remaining distal winglet portions 34 and 35 of winglets 8 and 9, respectively. The proximal portions 31 and 33 are not shown true to scale but are actually meant to comprise the proximal 6% of the overall spanwise length of the respective upstream and middle winglet 8 and 9.

It can be seen that at the transition from each proximal portion 31 and 33 to the respective distal portion 34 and 35, the respective spar 30 and 32 is divided into two spars 36 and 37 for the upstream winglet 8 and 38 as well as 39 for the middle winglet 9. The overall spar structure has a Y shape in some sense and looks a little bit like a tuning fork in the plan view of FIG. 28.

In the respective distal portion 34 and 35, the two spars are interconnected by ribs 40 to 43 extending along the winglet in the flight direction. These ribs are shown only symbolically. The precise number and position of ribs can be determined in an individual case. The basic idea here is that at least one rib in the respective distal portion serves for interconnecting the at least two spars in order to increase the torsional stiffness of the respective winglet 8 or 9. In the proximal portions 31 and 33, FIG. 28 does not show any rib (due to the very limited size of these proximal portions) but ribs would be possible also here. Because of only one spar 30 or 32 in the proximal portion, the torsional stiffness is much lower, even with one or several ribs in the proximal portion.

FIG. 28 also shows a downstream winglet 10 having three spars 44, 45, 46 and comparatively many ribs 47 to 51 as well (here five). Again, this is more symbolic to show a conventional and comparatively rigid implementation, in particular with regard to the torsional degree of freedom.

Obviously, winglets 8 and 9 are meant to show a substantial torsional elastic response, a majority of which appears in the respective proximal portion 31 or 33 whereas winglet 10 is meant to be torsionally stiff. The torsional response of this embodiment is due to the to some extent unavoidable bending of the winglets (not shown in the figures) corresponding to the dihedral angle as described earlier. Since the winglets 8 to 10 have a substantial sweep, a wind gust or other heavy load conditions will not only have the tendency to bend the winglets upwardly but since the center of lift will in such cases be located behind the respective torsional axis, the trailing edge of each winglet will show a stronger tendency to bend upwardly than the leading edge. Winglets 8 and 9 are adapted to make use of this by their torsional elasticity (or softness) so that during bending, a torsional morphing of the winglets appears.

This bending is not homogenously distributed along the spanwise length but predominantly appears in the proximal portion in order to arrive at a relatively large response of the inclination of the winglet (basically gamma, as explained earlier) to the load variation. In effect, the local angle of attack of the upstream and the middle winglet is substantially reduced compared to a non-twisting or a stiffer implementation thereof.

Figure 29:
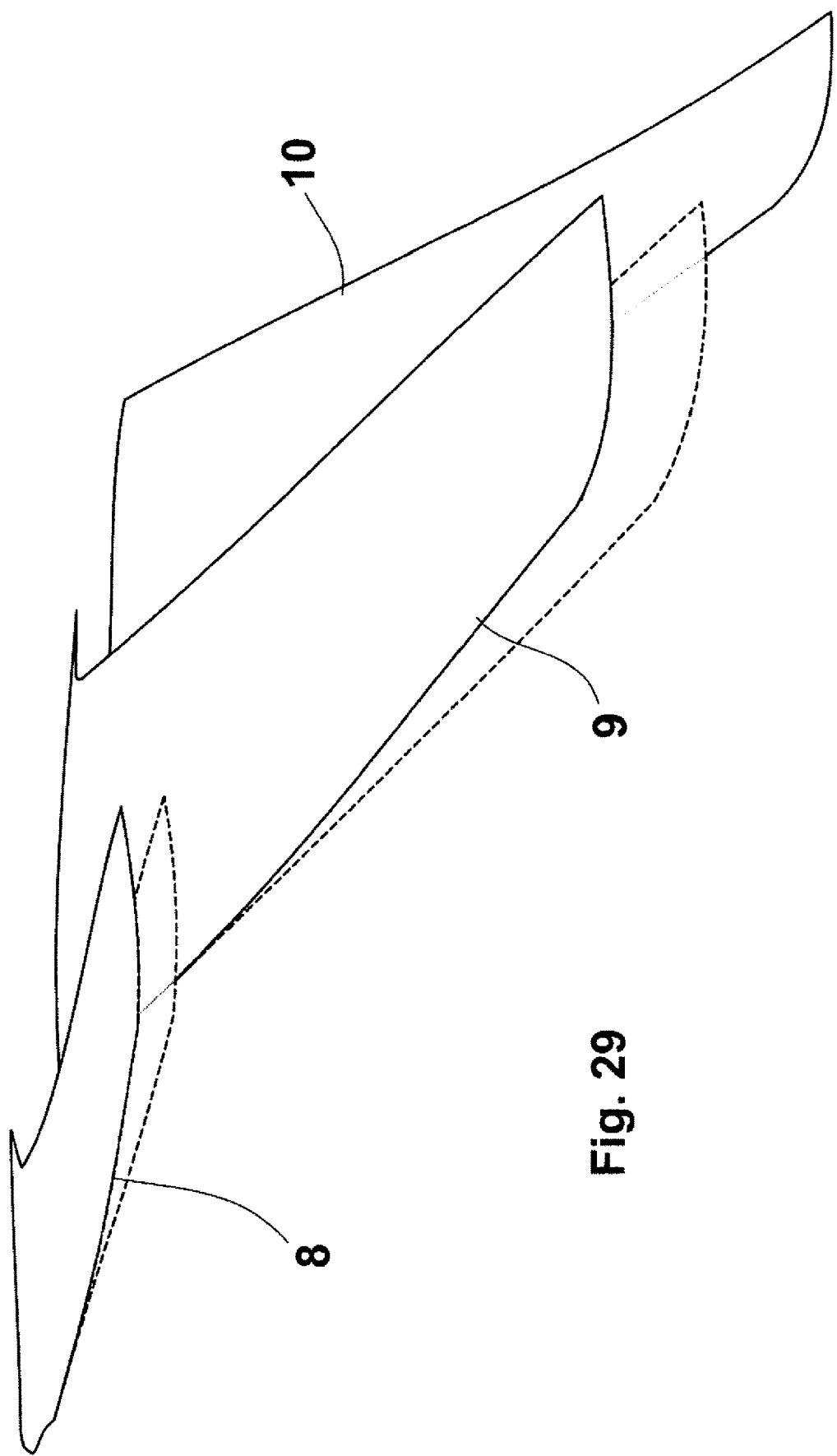
FIG. 29 is a perspective view of the three winglets with an upstream and a middle winglet in two positions for explaining a morphing movement.

FIG. 29 is a perspective view of the three winglets comparable to FIG. 25, but showing the upstream and the middle winglet 8 and 9 in two positions. The lower one corresponds to the in-flight shape and the upper one to the morphed shape in a 2.5 g case. It can readily be seen that both winglets are bent upwardly (in the sense of the dihedral angle delta). Somewhat more difficult to see is that the trailing edge (in FIG. 29 to the right) is bent somewhat stronger than the leading edge (to the left). This results in an increase of the absolute value of gamma (a decrease in view of that gamma is negative) along the spanwise length. A main part of this effect appears very near to the root of the respective winglets, compare FIG. 28, and thus has an effect for almost the complete winglet length, respectively.

However, FIG. 29 does not show a twisting and bending of the main wing which is, however, taken into regard in the calculations. The main wing twisting reduces the effective lift contribution of the winglet set under heavy load conditions somewhat, but much less than with the additional measures of the invention.

FIGS. 30 and 31 show graphs for the upstream winglet and the middle winglet, namely the actual twist and the bending of the winglets along the relative spanwise length (0-100%). It can be seen that within the proximal 6% of the spanwise length, about 2° for the upstream winglet and about 4.8° for the middle winglet appear as a morphing twist angle near the root, whereas further about 1.5°-2° appear along the rest of the spanwise length.

In case of the upstream winglet, about 1.75° of the 2° shown are due to the substantially reduced torsional stiffness in the proximal portion. In other words, about 0.25° torsional morphing would appear in the proximal portion if the graph, as shown for the rest of the winglet, would be extrapolated analogously down to 0% spanwise length. In the same sense, about 4.5° of the above mentioned 4.8° for the middle winglet are due to the reduced torsional stiffness near the root.

A decrease of the twist graph for the upstream winglet between 80% and 100% spanwise length can be seen in FIG. 30. This is a real result but not intended. Since the winglet in-flight shape explained earlier has been optimized and simulated without an intentional twisting of the winglets along their spanwise length, so far, the jig shape had to be twisted to some extent (in the opposite sense than the morphing explained here) in order to compensate for the elastic deformation appearing between the jig shape and the in-flight shape. This has been overdone to some extent near the tip of the upstream winglet.

Naturally, this could be compensated for in a further step. Additionally, since the airflow inclination in the main wing's tip vortex is weaker with increasing distance from the main wing's tip, some twisting of the winglets in the in-flight shape makes sense and could be included in a further step. This twisting would, then, be even more pronounced for the upstream winglet and the middle winglet for the high load case. Analogously, since the downstream winglet shall be much stiffer, torsionally, the difference between the jig shape and the in-flight shape would be much smaller, here, in consequence.

Further, FIGS. 30 and 31 show a graph relating to the respective vertical axis at the right showing the z displacement of the leading edge and thus the bending mentioned earlier. The respective trailing edge is bent somewhat stronger which results in the torsional morphing, as explained.

These results have been calculated by combining the above mentioned computer fluid dynamics calculations (CFD) and finite element method calculations (FEM). The former can produce the aerodynamic loads in the in-flight shape. On this basis, with the latter, a jig shape (without aerodynamic loads and without gravity) can be calculated in the one direction and a first approach for a morphed heavy load shape (2.5 g) in the other direction. For the heavy load shape, the aerodynamic loads can be recalculated by CFD, and by iteration, convergence is used to determine a sufficiently precise result.

The heavy load case is to be described somewhat more precisely as follows: one of the severe test cases of the flight envelope to be defined or secured is called severe turbulence climb and it has been assumed here. The speed has been 317 knots (true air speed) at an altitude of 10,000 ft and a density of 0.905 kg/m$^3$ at an international standard atmosphere (ISA ±00) with a complete airplane mass of 60 t.

Table III shows various numerical data for a (global) angle of attack of the airplane of 8°.

Therein, the code P2165 refers to a completely stiff structure having the already explained in-flight shape and the code PC165 is the morphing structure as explained. It can be seen that the lift is at about 150 t (2.5×60 t) in both cases and that a torque can be reduced by about 25% for the upstream winglet, by about 38% for the middle winglet, and by (only) 7% for the downstream winglet. The torque is related to an axis parallel to the airplane longitudinal axis and the position of the outermost rib of the standard main wing of the A320 airplane, namely a so-called "rib 27". This rib is used for fixing a winglet set according to the invention so that torques at this position are structurally relevant.

Further, table III also shows an overall reduction of the torque of the winglet set (wing tip) as a complete unit by 29%. This value relates not only to the addition of the three winglets but also includes a contribution of an outer main wing part between the already mentioned outermost rib 27 and the winglets as such.

Quite clearly, the strong reduction of the torque for the middle winglet can be attributed to the relatively strong twisting achieved there. This strong twisting or morphing effect is a result also of the relatively large aerodynamic effect of the middle winglet, first due to its size and second due to its position in the airflow as conditioned by the upstream winglet.

Correspondingly, the torque reduction for the upstream winglet is considerable but less pronounced.

For the downstream (third) winglet, a limited torque decrease can be achieved. However, due to the strongly reduced downwash of the first and of the middle winglet, a substantial torque increase of the third winglet would appear without the stall mechanism already described.

Figure 33:
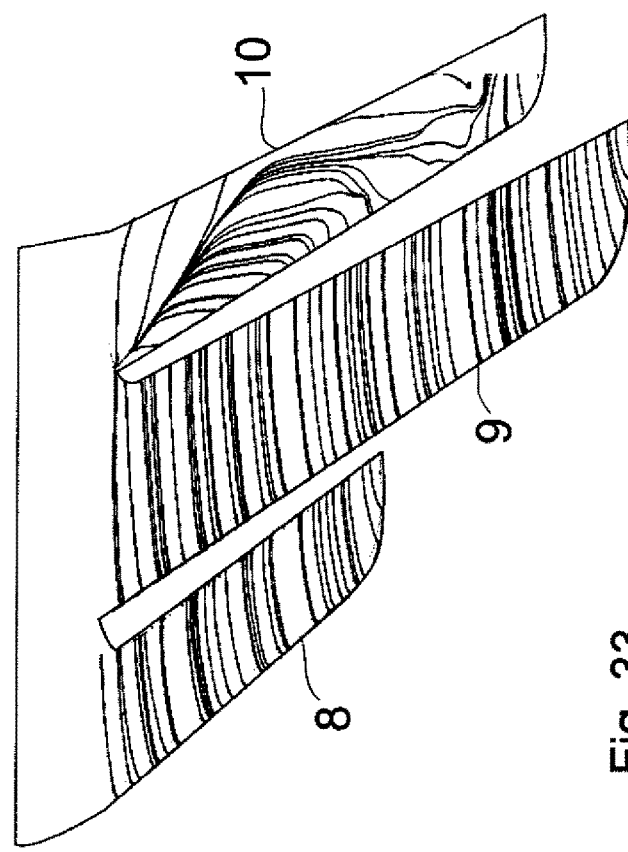
FIGS. 32 and 33 show a streamline visualization of the three winglets.
Figure 32:
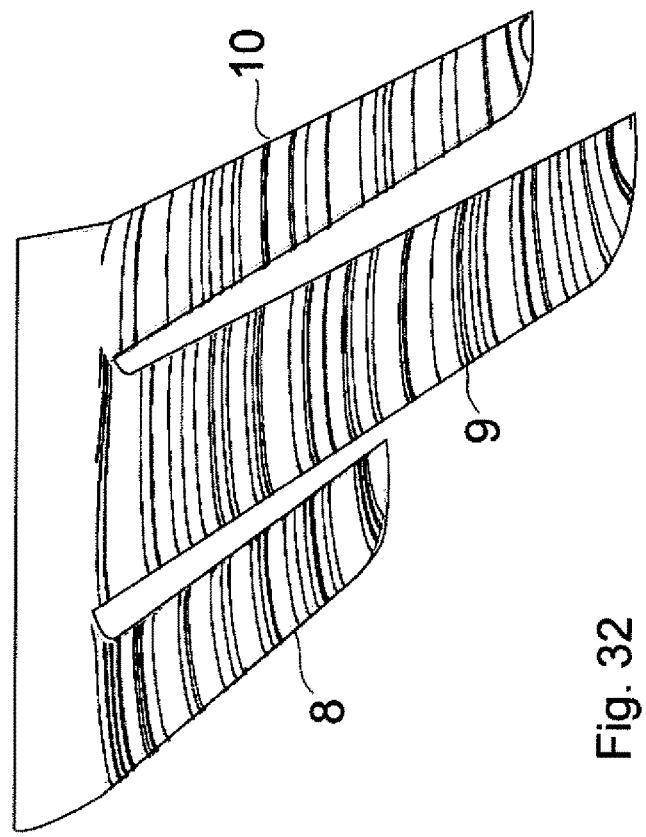
Figure 35:
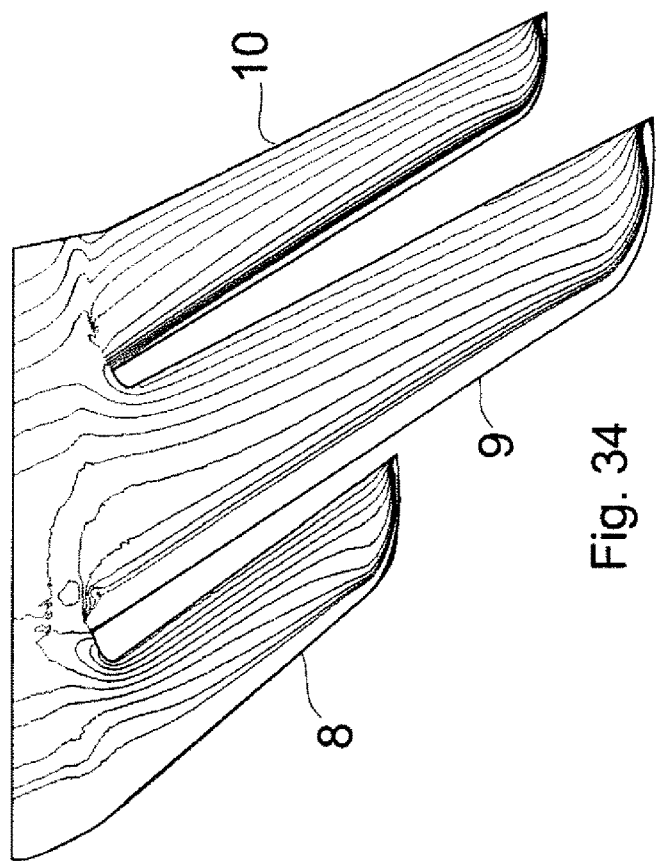
FIGS. 34 and 35 show an isobar visualization of the three winglets for illustrating stall of a downstream winglet.
Figure 34:
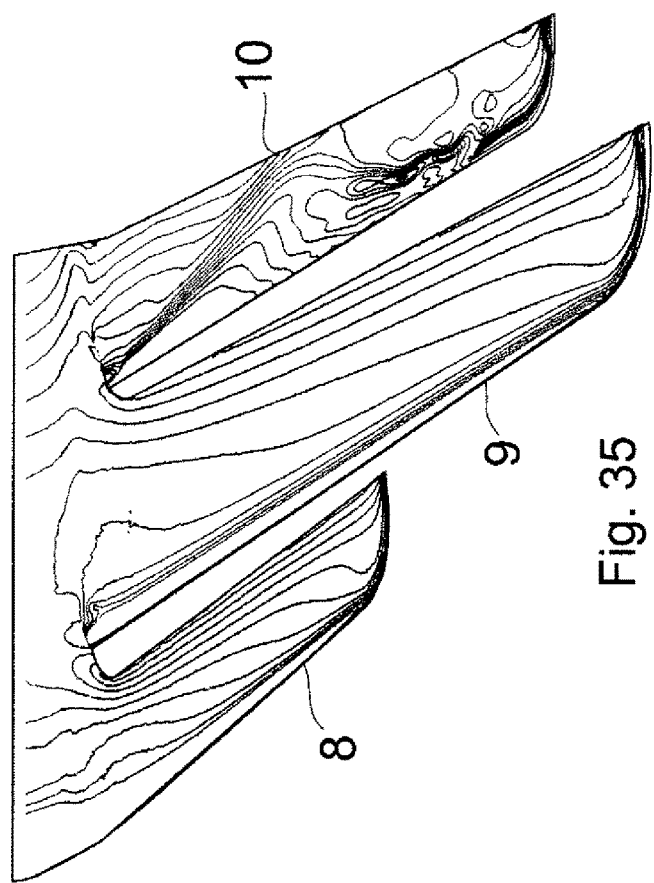

FIGS. 32-35 give a visualization of the stall of the third winglet by showing stream lines in FIGS. 32 and 33 and isobars in FIGS. 34 and 35. FIGS. 32 and 34 show a rigid (fictional) embodiment whereas FIGS. 33 and 35 show the morphed state of the upstream winglet and the middle winglet, all figures showing heavy load conditions.

First, FIG. 33 quite clearly shows substantially distorted stream lines along almost the complete spanwise length of the downstream winglet with a very small exception at the tip. Analogously, the isobars in FIG. 35 are severely distorted compared to FIG. 34 for the rigid case.

Further, a comparison of the upstream and middle winglets' regions near their respective leading edge in FIGS. 34 and 35 show that the distance from the respective leading edge to the next isobar is much smaller in FIG. 35 and also the following isobars appear nearer to the leading edge. This means that the under-pressure region above the respective winglet is smaller and less pronounced in the morphed case in FIG. 35. The result is a respectively decreased lift of these winglets.

Figure 36:
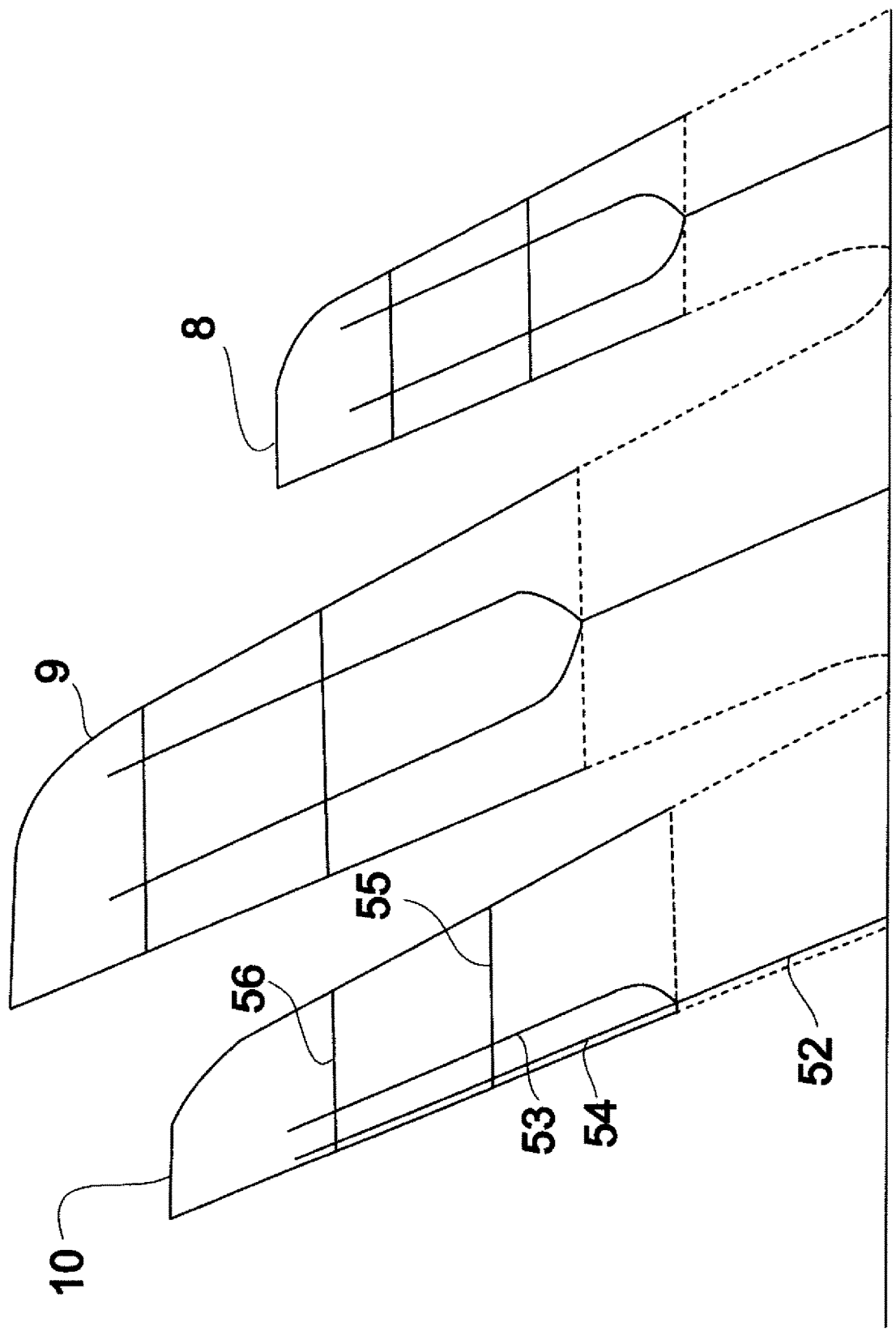
FIG. 36 corresponds to FIG. 28 but shows an alternative embodiment with regard to the downstream winglet.

FIG. 36 shows an alternative embodiment compared to FIG. 28 wherein the structures of the upstream winglet 8 and the middle winglet 9 have not been changed, but the structure of the downstream winglet 10. There is a similar combination of a single spar 52 in the proximal 6% portion (hatched line) with a double spar 53 and 54 outwardly therefrom (and thus a Y-shape). Further, there are two (more symbolical) ribs 55 and 56 as the ribs of the upstream and the middle winglet 8, 9. However, the spars are much nearer to the trailing edge of the downstream winglet 10. Again, this is not true to scale but shall indicate that by shifting the structural elements near to the trailing edge, the torsional elastic properties can be determined and the downstream winglet can be made to morph in an opposite sense as the upstream and the middle winglet.

Figure 37:
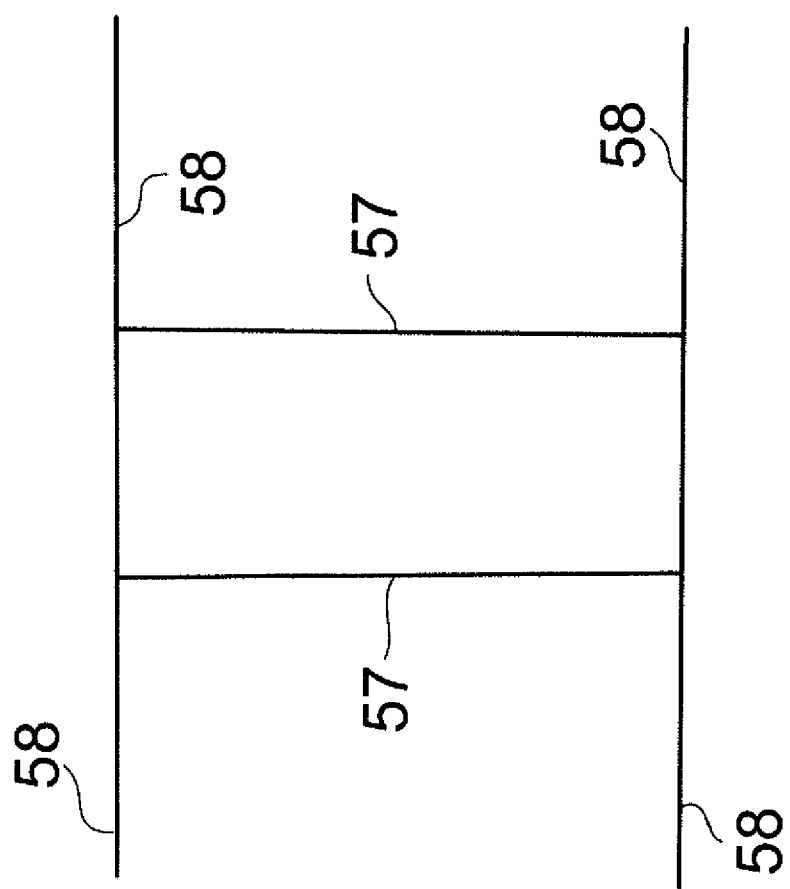
FIG. 37 shows a typical section through a spar in FIG. 28 and FIG. 36.

FIG. 37 shows a typical section through a spar as in FIG. 28 or FIG. 36. The spar consists of a double vertical structure 57 and a respective horizontal structure 58 at the bottom and the top thereof. These parts can be made by carbon-fibre-reinforced plastic as known to the skilled person. The space therein could be filled by a light-weight and stiff foam material such as "ROHACELL HERO" of EVONIK, a light-weight closed-cell aircraft foam, or another known aircraft foam familiar to the skilled reader.

A similar foam could be used outside to fill the residual volume of the winglet. An outer coat of the winglet could be produced by a combination of for example two layers of glass-fiber reinforced plastic, twenty layers of carbon-fiber reinforced plastic, or by an aluminium sheet.

Figure 38:
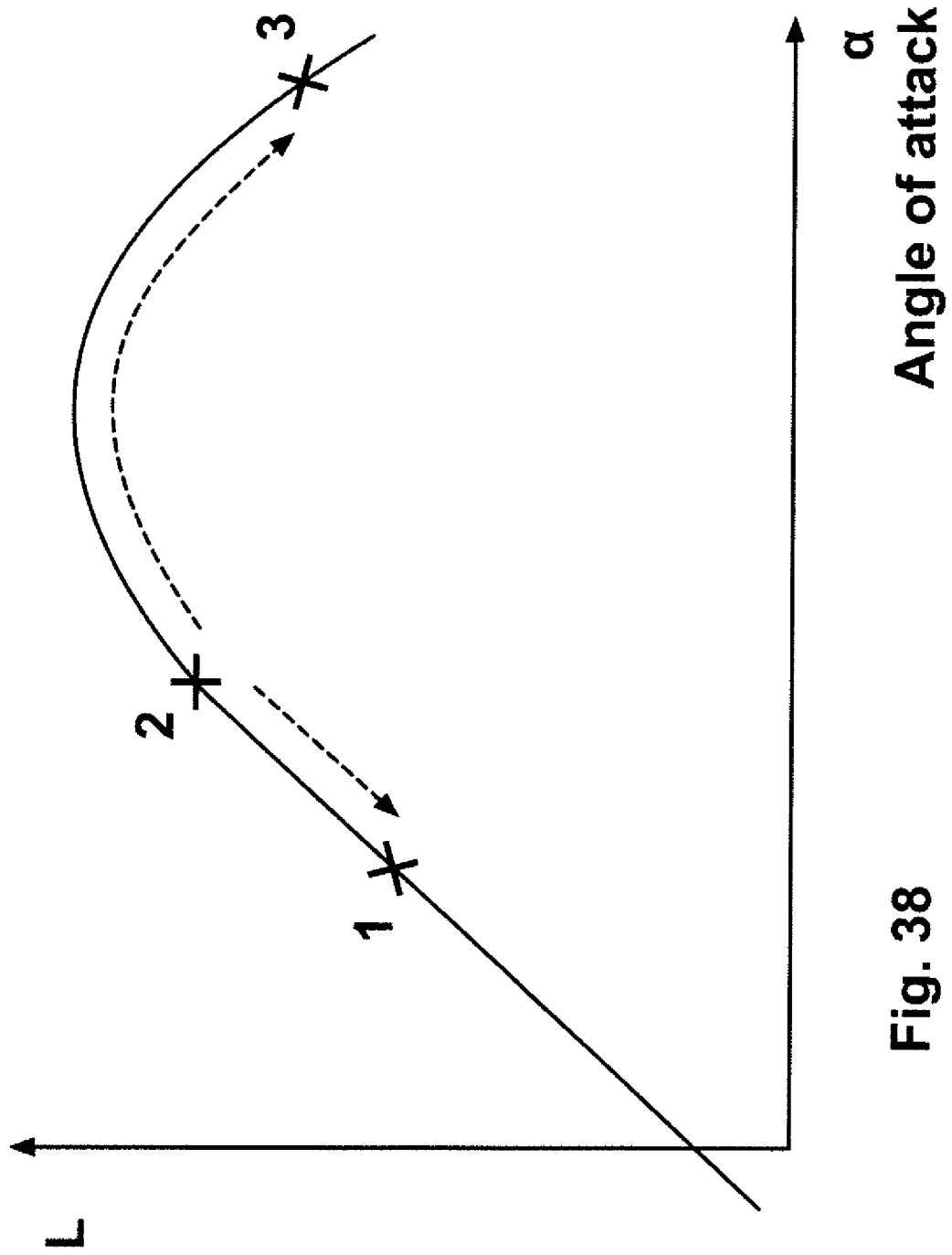
FIG. 38 shows a graph illustrating a general dependency of the aerodynamic lift on the angle of attack.

FIG. 38 shows a graph of the general dependency of the aerodynamic lift (vertical axis) on the angle of attack (horizontal axis). Therein, even at an angle of attack of zero, some lift is produced (for an asymmetric airfoil). With increasing angle of attack, the lift is increased approximately in a linear manner up to some saturation region where the graph is rounded. In this rounded saturation region, the lift reaches a broad maximum with a maximum lift that the respective airfoil can produce and is decreased with even more increasing angle of attack. This decrease is due to commencing and increasing stall.

Thus, from a conservative operation point as for example point 2 in the graph more or less at the end of the linear region, the lift can be reduced by reducing the angle of attack and thus going down the linear part of the graph, for example to position 1. This is done for winglets 8 and 9. However, since the reduced downwash of these winglets increases the angle of attack for winglet 10 anyhow, it can be brought into stall, such as in position 3. There, the lift is reduced at least to the maximum possible lift.

By the way, the 150 t value of the 2.5 g case considered is very near to the maximum lift of the main wings of the airplane.

FIG. 39 shows a leading part of sections of two airfoils. The rounded section 60 is a classical leading edge of an asymmetric airfoil. The sharp one 61 is so to say an integrated stall strip, namely a sharp edge at or near the leading edge. Such a sharp airfoil edge 61 or a stall strip (an added strip structure) have proven to be valuable for enhancing the occurrence of stall at winglet 10. Thus, such a sharp edge is preferred for this winglet.

Still further, the shape of the airfoil has some influence on the occurrence of stall. Therefore, it can make sense to use a thinner airfoil for the downstream winglet compared to the upstream winglet and the middle winglet (if any).

TABLE I

| Run CFDC | Finger 1 γ | Finger 1 δ | Finger 2 γ | Finger 2 δ | Outboard section of wing X-Force (Sim) [N] | Outboard section of wing Z-Force (Sim) [N] | Finger 1 X-Force (Sim) [N] | Finger 1 Z-Force (Sim) [N] |
|---|---|---|---|---|---|---|---|---|
| V204b_L02 | | | | | 839 | 68862 | −38 | 6331 |
| V0040_A245_L02 | −10 | −20 | −05 | −10 | 730 | 67992 | −160 | 1805 |
| V0046_A245_L02 | −08 | −20 | −05 | −10 | 731 | 68172 | −151 | 2339 |
| V0090_A245_L02 | −12 | −20 | −05 | −10 | 733 | 67839 | −137 | 1230 |
| V0092_A245_L02 | −10 | −10 | −05 | −10 | 719 | 67718 | −162 | 1748 |
| V0091_A245_L02 | −10 | −30 | −05 | −10 | 743 | 68214 | −150 | 1716 |
| V0038_A245_L02 | −10 | −20 | −03 | −10 | 753 | 68711 | −173 | 1916 |
| V0042_A245_L02 | −10 | −20 | −07 | −10 | 711 | 67221 | −150 | 1633 |
| V0093_A245_L02 | −10 | −20 | −05 | −00 | 709 | 67910 | −146 | 1821 |
| V0094_A245_L02 | −10 | −20 | −05 | −20 | 754 | 68031 | −165 | 1683 |

| Run CFDC | Finger 2 X-Force (Sim) [N] | Finger 2 Z-Force (Sim) [N] | Complete wing Ratio Lift/Drag [—] | delta X-Force [N] | drag reduction [%] | Ratio Lift/Drag improvement [%] |
|---|---|---|---|---|---|---|
| V204b_L02 | 0 | 0 | 22.9 | | | |
| V0040_A245_L02 | −244 | 4553 | 24.4 | −476 | −2.72 | 6.33 |
| V0046_A245_L02 | −200 | 4202 | 24.3 | −422 | −2.41 | 5.91 |
| V0090_A245_L02 | −281 | 5135 | 24.4 | −486 | −2.78 | 6.32 |
| V0092_A245_L02 | −223 | 4632 | 24.3 | −469 | −2.68 | 6.16 |
| V0091_A245_L02 | −266 | 4741 | 24.4 | −479 | −2.71 | 6.32 |
| V0038_A245_L02 | −146 | 5931 | 24.3 | −368 | −2.10 | 6.09 |
| V0042_A245_L02 | −227 | 3272 | 24.2 | −468 | −2.67 | 5.44 |
| V0093_A245_L02 | −240 | 4594 | 24.4 | −479 | −2.73 | 6.34 |
| V0094_A245_L02 | −249 | 4576 | 24.3 | −461 | −2.64 | 5.96 |

TABLE II

P0001 vs B0001 - wing only

| m [t] | P0001 L/D | B0001 L/D | Ratio Lift/Drag improvement [%] |
|---|---|---|---|
| 55.0 | 27.7 | 27.1 | 1.9 |
| 60.0 | 27.1 | 26.3 | 2.8 |
| 65.0 | 25.8 | 24.9 | 3.5 |
| 70.0 | 24.1 | 23.1 | 4.1 |
| 75.0 | 22.3 | 21.3 | 4.5 |
| 80.0 | 20.5 | 19.6 | 4.7 |

TABLE III

| airplane geometry | airplane lift [t] | wingtip x-moment [kNm] |
|---|---|---|
| P2165 (AoA 8°) | 151.2 | −11.09 100% |
| PC165 (AoA 8°) | 150.1 | −7.83 71% |

| geometry | winglet 1 x-moment [kNm] | winglet 2 x-moment [kNm] | winglet 3 x-moment [kNm] |
|---|---|---|---|
| P216S (AoA 8°) | −2.17 100% | −6.59 100% | −2.19 100% |
| PC165 (AoA 8°) | −1.62 75% | −4.06 62% | −2.04 93% |

The invention claimed is:

1. A wing for an airplane, extending from an inner wing end configured to be mounted to a base body of said airplane towards an outer wing end, the wing comprising:

at least two winglets at the outer wing end, wherein an upstream one of the winglets precedes a downstream one of the winglets in a flight direction (x), wherein the upstream winglet comprises torsional elastic properties with regard to a longitudinal axis thereof such that a local angle of attack in a plane (xz) parallel to the flight direction, between said upstream winglet's chord line and an airflow direction at said upstream winglet's leading edge, is reduced under high aerodynamic load conditions, due to a torsional elastic reaction of the upstream winglet to said high aerodynamic load conditions, wherein the downstream winglet experiences a downwash of the upstream winglet, said downwash being reduced by said torsional elastic reaction of said upstream winglet, and wherein a local angle of attack in a plane (xz) parallel to the flight direction (x), between said downstream winglet's chord line and an airflow direction at said downstream winglet's leading edge, is increased under said high aerodynamic load conditions at least in part due to said reduction of said downwash such that stall appears at said downstream winglet.

2. The wing of claim 1, wherein said downstream winglet comprises torsional elastic properties with regard to a longitudinal axis thereof such that a local angle of attack in a plane (xz) parallel to the flight direction (x), between said downstream winglet's chord line and an airflow direction at said downstream winglet's leading edge, is increased under high aerodynamic load conditions.

3. The wing of claim 1, wherein an aerodynamic hull of at least said upstream winglet is torsionally deformable, along a spanwise length of said at least upstream winglet, due to the torsional elastic reaction of said upstream winglet under said at least high aerodynamic load conditions.

4. The wing of claim 3, wherein said torsional deformation of said at least upstream winglet hull is more pronounced in a portion of said at least upstream winglet proximal to said main wing than in a distal portion of said at least upstream winglet, said proximal portion comprising at most 50% of a spanwise length of said at least upstream winglet and said distal portion comprising a rest of the spanwise length.

5. The wing of claim 1, wherein at least said upstream winglet comprises, within its aerodynamic hull and along at least a portion proximal to said main wing, a single structural member along a spanwise direction of said at least upstream winglet, adapted to be torsionally elastic due to comprising a single structural member.

6. The wing of claim 5, wherein said single structural member is divided into at least two parts,
wherein said at least two parts of said structural member are arranged in a proximal portion of said at least upstream winglet and are mutually spaced in a direction of a chord line of said at least upstream winglet to reduce the torsional elasticity of said at least upstream winglet in said distal portion, and
wherein said at least two structural members in said distal portion are interconnected by at least one rib.

7. The wing of claim 1, wherein said local angle of attack of said upstream winglet is reduced by at least 0.5° in average along said upstream winglet's spanwise length at a high aerodynamic load of 2.5 g compared to normal flight conditions of 1 g.

8. The wing of claim 1, wherein there is no active morphing actuator for said winglets.

9. The wing of claim 1, wherein at least two and at most three winglets are arranged sequentially with regard to the flight direction, wherein the upstream winglet is, with regard to a spanwise length, shorter than the succeeding winglet.

10. The wing of claim 8, comprising three winglets, wherein a middle one of said three winglets comprises torsional elastic properties with regard to a longitudinal axis thereof, such that a local angle of attack in a plane (xz) parallel to the flight direction between said middle winglet's chord line and an airflow direction at said middle winglet's leading edge is reduced under high aerodynamic load conditions.

11. The wing of claim 1, wherein said downstream winglet comprises a stall strip or a sharp leading edge.

12. The wing of claim 1, wherein said downstream winglet is adapted not to show a torsional elastic deformation under said high aerodynamic load conditions.

13. The wing of claim 9, wherein said upstream winglet and an adjacent winglet are mutually inclined as seen against the flight direction (x), by a relative dihedral angle (Δδ) in an interval from 5° to 35°,
wherein said relative dihedral angle (Δδ) is defined as the opening angle at said winglets' root of an isosceles triangle having one vertex (R) on the root, namely at a splitting point of both winglets in horizontal direction (y) and in the middle of the positions of leading edges of said winglets in vertical direction (z), one vertex (V1) on the leading edge of said upstream winglet and one vertex (V2) on the leading edge of said adjacent winglet, as seen in a projection against said flight direction (x), said triangle having a variable length of two equal triangle sides (RV1,RV2),
wherein said relative dihedral angle (Δδ) interval is valid for at least 70% of the equal side (RV1,RV2) length along a shorter one of said upstream winglet and said adjacent winglet,
wherein, when the wing comprises two winglets, the adjacent winglet comprises said downstream winglet, and when the wing comprises three winglets said adjacent winglet comprising a middle winglet, and
wherein said middle winglet and said downstream winglet are mutually inclined, as seen against the flight direction (x), by the same relative dihedral angle interval.

14. The wing of claim 9, wherein said winglets are inclined as regards their respective winglet chord line, namely at a position 10% of said winglet's length outward of a splitting into said winglets of said wing, relative to a main wing chord line of said wing, at a position 10% of a main wing length of said wing inwards of a splitting into said winglets of said wing, around a horizontal axis (y) which is perpendicular to said flight direction (x) by:
an angle of incidence gamma 1 in an interval from −15° to −5° for said upstream winglet,
an angle of incidence gamma 2 in an interval from −10° to 0° for an adjacent winglet at their respective root, and in an interval from −13° to −3° for said upstream winglet, and in an interval from −8° to +2° for said adjacent winglet at their respective tip, and
an angle of incidence gamma 3, for the downstream winglet when the wing comprises and in case of three winglets, in an interval from −7° to +3° at its root and an interval from −5° to +5° at its tip,
wherein the angle of incidence interval is linearly interpolated between the respective winglet's root and tip,
wherein a positive angle of incidence means a clockwise rotation of the winglet as seen from said airplane's left side, and
wherein said incidence angle intervals are valid for at least 70% of a spanwise length along said respective winglet.

15. The wing of claim 1, wherein said upstream winglet is upwardly inclined, as seen against the flight direction (x), relative to said downstream winglet and, wherein, when the wing comprises three winglets, a middle winglet is upwardly inclined relative to said downstream winglet and downwardly inclined relative to said upstream winglet, as seen against the flight direction (x).

16. An airplane having a body and at least two wings at opposed sides of said body, wherein each of said wings comprises:
an inner wing end mounted to a base of said body, wherein said wing extends from the inner wing end towards an outer wing end, wherein at least two winglets are arranged at the outer wing end,
wherein an upstream one of the winglets precedes a downstream one of the winglets in a flight direction (x), the upstream winglet having torsional elastic properties with regard to a longitudinal axis thereof such that a local angle of attack in a plane (xz) parallel to the flight direction, between said upstream winglet's chord line and an airflow direction at said upstream winglet's leading edge, is reduced under high aerodynamic load conditions due to a torsional elastic reaction of the upstream winglet to said high aerodynamic load conditions, wherein the downstream winglet experiences a downwash of the upstream winglet, said downwash being reduced by said torsional elastic reaction of said upstream winglet, and wherein a local angle of attack in a plane (xz) parallel to the flight direction (x), between said downstream winglet's chord line and an airflow direction at said downstream winglet's leading edge, is increased under said high aerodynamic load conditions at least in part due to said reduction of said downwash such that stall appears at said downstream winglet.

17. A method comprising:

mounting an add-on part to a wing of an airplane, said add-on part comprising a winglet set of two or three winglets, by attaching said two or three winglets to an outer wing end of the wing, the wing extending from an inner wing end mounted to a base body of said airplane toward the outer wing end, wherein the winglet set is attached to the outer wing end such that an upstream one of the winglets precedes a downstream one of the winglets in a flight direction (x), the upstream winglet having torsional elastic properties with regard to a longitudinal axis thereof such that a local angle of attack in a plane (xz), parallel to the flight direction between said upstream winglet's-chord line and an airflow direction at said upstream winglet's leading edge, is reduced under high aerodynamic load conditions, due to a torsional elastic reaction of the upstream winglet to said high aerodynamic load conditions, wherein the downstream winglet experiences a downwash of the upstream winglet, said downwash being reduced by said torsional elastic reaction of said upstream winglet, and wherein a local angle of attack in a plane (xz) parallel to the flight direction (x), between said downstream winglet's chord line and an airflow direction at said downstream winglet's leading edge, is increased under said high aerodynamic load conditions at least in part due to said reduction of said downwash such that stall appears at said downstream winglet.

18. The method of claim 17, further comprising replacing at least one element from the outer wing end with said winglet set, to thereby substitute another wing structure onto said airplane.

19. The wing of claim 5, wherein said single structural member is a spar.

20. The wing of claim 9, wherein three winglets are arranged sequentially with regard to the flight direction, wherein the upstream winglet is, with regard to the spanwise length, shorter than the succeeding winglet, and wherein, the downstream winglet is shorter than the middle winglet.

* * * * *